(12) United States Patent
Vlachos et al.

(10) Patent No.: US 6,940,503 B2
(45) Date of Patent: Sep. 6, 2005

(54) METHOD AND APPARATUS FOR PROCESSING NON-PLANAR VIDEO GRAPHICS PRIMITIVES

(75) Inventors: Alexander C. Vlachos, Brighton, MA (US); Vineet Goel, Winter Park, FL (US)

(73) Assignee: ATI International SRL, Christchurch (BB)

( * ) Notice: Subject to any disclaimer, the term of this patent is extended or adjusted under 35 U.S.C. 154(b) by 339 days.

(21) Appl. No.: 09/852,808

(22) Filed: May 10, 2001

(65) Prior Publication Data

US 2003/0016217 A1 Jan. 23, 2003

(51) Int. Cl.[7] .............................................. G06T 17/00
(52) U.S. Cl. ...................................................... 345/419
(58) Field of Search ................................ 345/419, 420, 345/423, 427, 428, 442, 582, 588

(56) References Cited

U.S. PATENT DOCUMENTS 6,462,738 B1 * 10/2002 Kato .......................... 345/428

* cited by examiner

Primary Examiner—Almis Jankus
(74) Attorney, Agent, or Firm—Vedder, Price, Kaufman & Kammholz, P.C.

(57) ABSTRACT

A method and apparatus for processing non-planar video graphics primitives is presented. Vertex parameters corresponding to vertices of a video graphics primitive are received, where the video graphics primitive is a non-planar, or higher-order, video graphics primitive. A cubic Bezier control mesh is calculated using the vertex parameters provided for the non-planar video graphics primitive. Two techniques for calculating control points included in the cubic Bezier control mesh along the edges of the non-planar video graphics primitive are described. The central control point is determined based on the average of a set of reflected vertices, where each of the reflected vertices is a vertex of the non-planar video graphics primitive reflected through a line defined by a pair of control points corresponding to the vertex. The resulting cubic Bezier triangular control mesh is evaluated using the Bernstein polynomial at the vertices of the planar video graphics primitives that result from tessellation, where the number of planar video graphics primitives produced can be controlled based on a selected tessellation level. The resulting planar video graphics primitives are then provided to a conventional 3D pipeline for processing to produce pixel data for blending in the frame buffer.

49 Claims, 13 Drawing Sheets

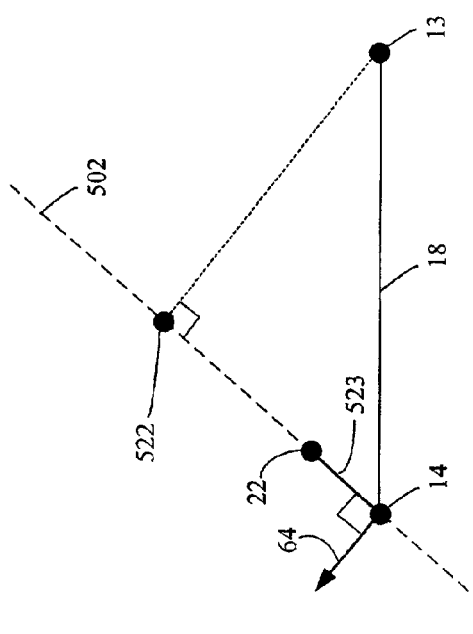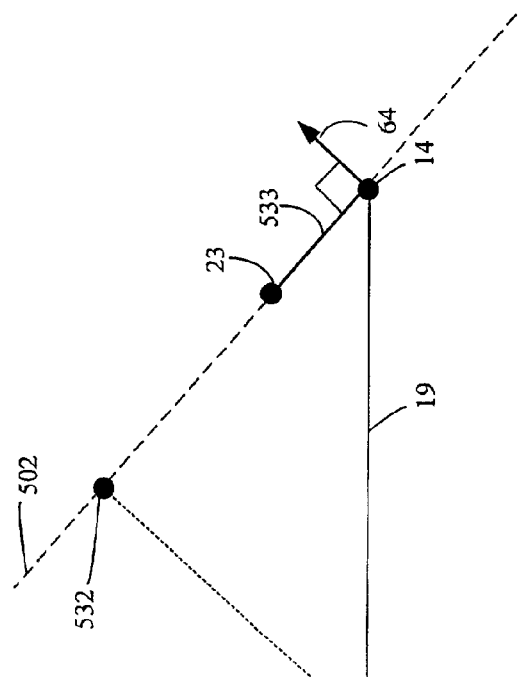

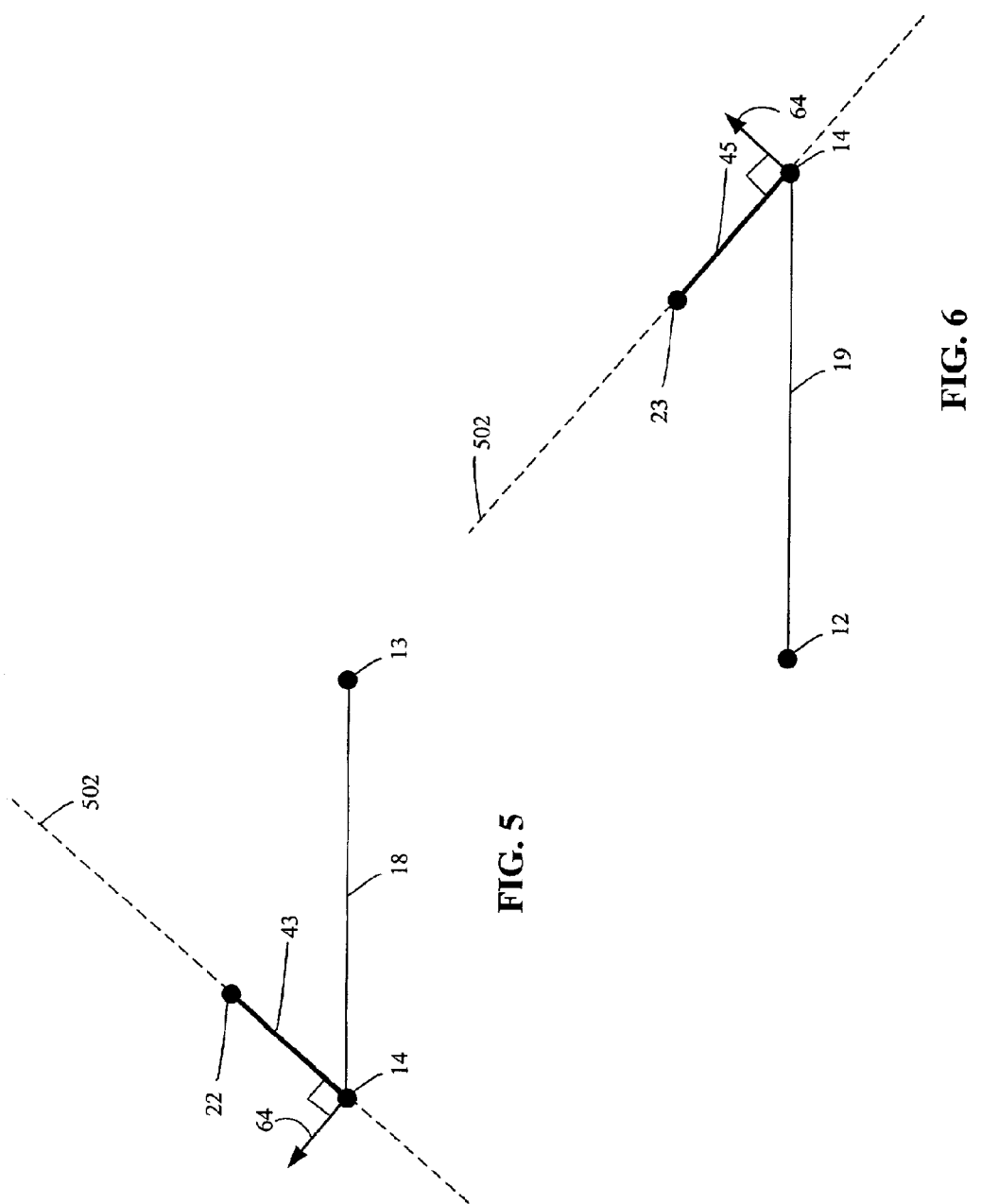

METHOD AND APPARATUS FOR PROCESSING NON-PLANAR VIDEO GRAPHICS PRIMITIVES

CROSS-REFERENCE TO RELATED APPLICATIONS

The present application is related to the following co-pending, commonly assigned U.S. Patent Applications:

U.S. patent application Ser. No. 09/556,474, entitled "A Geometric Engine Including A Computational Module For Use In A Video Graphics Controller" and filed Apr. 21, 2000; and U.S. patent application Ser. No. 09/853,840, entitled "Apparatus for Processing Non-Planar Video Graphics Primitives and Associated Method of Operation" and filed on an even date herewith.

FIELD OF THE INVENTION

The invention relates generally to video graphics processing and more particularly to an apparatus for processing non-planar video graphics primitives and an associated method of operation.

BACKGROUND OF THE INVENTION

Video graphics systems typically use planar primitives, such as triangles, to represent three-dimensional objects. The three-dimensional (3D) pipeline that processes the triangular primitives rasterizes these planar primitives to produce pixel data that is blended with additional pixel data stored in a frame buffer. The results produced in the frame buffer are then fetched and a display signal is generated such that the three-dimensional objects are shown on the display.

Some non-planar or curved surfaces or objects require a large number of planar video graphics primitives in order to be accurately represented. These curved surfaces are broken into a large number of planar primitives that are then provided to the three-dimensional graphics processing pipeline for rendering. Typically, the separation of the curved surfaces into planar primitives is performed in software. This requires a large amount of processing resources on the part of the central processor within the system. In addition, a large amount of data traffic results from the processor sending the vertex data corresponding to all of the planar triangles to the 3D pipeline for processing.

Therefore, a need exists for a method and apparatus for processing non-planar video graphics data that offloads the central processor and reduces the bandwidth required to provide the primitive data from the central processor to the 3D pipeline.

BRIEF DESCRIPTION OF THE DRAWINGS

FIGS. 3 and 4 illustrate a graphical representation of a first technique used to determine control points that relate to an edge of the non-planar video graphics primitive in accordance with a particular embodiment of the present invention.

FIGS. 5 and 6 illustrate a graphical representation of a second technique used to determine control points that relate to an edge of the non-planar video graphics primitive in accordance with a particular embodiment of the present invention.

DETAILED DESCRIPTION OF A PREFERRED EMBODIMENT

Generally, the present invention provides a method and apparatus for processing non-planar video graphics primitives. This is accomplished by receiving vertex parameters corresponding to vertices of a video graphics primitive, where the video graphics primitive is a non-planar, or high-order, video graphics primitive. A cubic Bezier control mesh is calculated using the vertex parameters provided for the non-planar video graphics primitive. Two techniques for calculating locations of control points included in the cubic Bezier triangular control mesh relating to the edges of the non-planar video graphics primitive are described in additional detail below. A location of a central control point is determined based on a weighted average of the locations of the other control points and the locations of the original vertices of the high-order primitive. The resulting cubic Bezier triangular control mesh can then be evaluated using any method for evaluating Bezier surfaces at the vertices of planar video graphics primitives that result from tessellation, where the number of planar video graphics primitives produced can be controlled based on a selected tessellation level. The resulting planar video graphics primitives are then provided to a conventional 3D pipeline for processing to produce pixel data for blending in a frame buffer.

By allowing the central processor within the video graphics processing system to pass non-planar, or high-order, video graphics primitives to circuitry that generates planar primitives from the high-order primitive using a cubic Bezier triangular control mesh, the processing bandwidth needed for video graphics primitive generation within the central processor is significantly reduced for 3D applications. Furthermore, the amount of data that must be sent from the central processor to the circuitry which processes the primitives generated by the central processor is greatly reduced as a single high-order video graphics primitive is sent rather than a large number of planar video graphics primitives resulting from tessellation of the high-order video graphics primitive in software. An additional benefit may be realized in that hardware may be able to perform the calculations required for tessellation more rapidly than is possible in software, thus increasing the overall speed of the video graphics processing system. Furthermore, the resulting planar primitives produced by the hardware tessellation are generally the same as those planar primitives resulting from software tessellation performed in prior art systems. As such, no modification to the 3D pipeline is required in order to support processing of these planar primitives.

Figure 1:
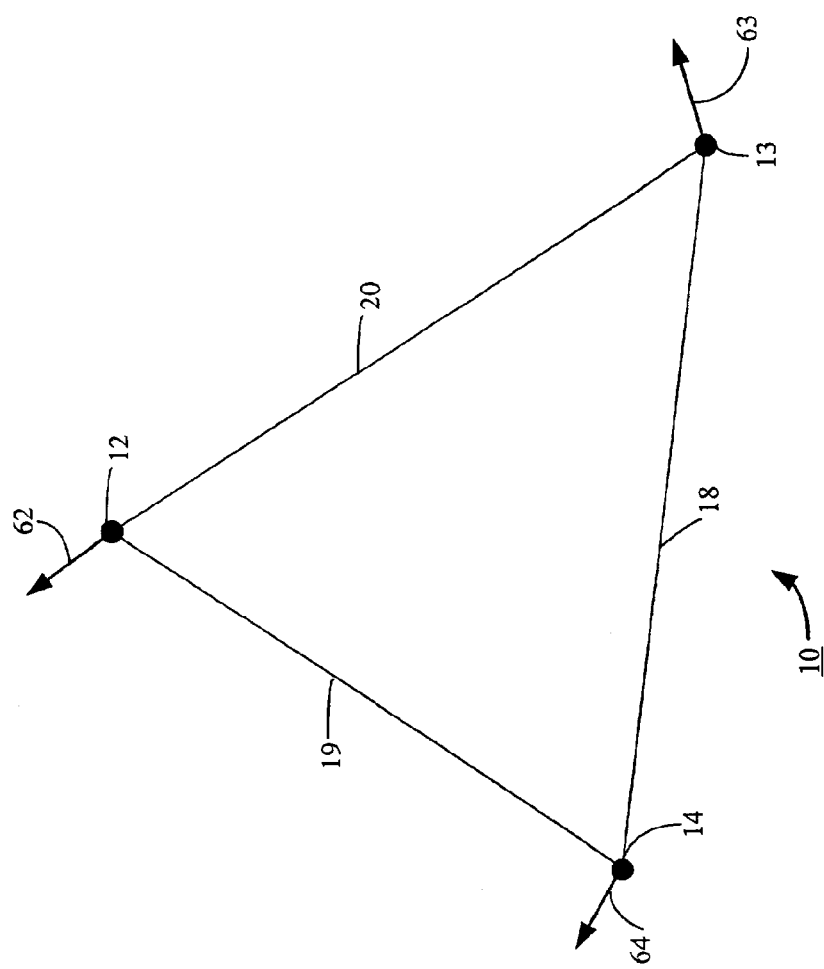
FIG. 1 illustrates a graphical representation of a non-planar video graphics primitive in accordance with a particular embodiment of the present invention.

The invention can be better understood with reference to FIGS. 1–15, in which like reference numerals designate like items. FIG. 1 illustrates a high-order, or non-planar, video graphics primitive 10. Video graphics primitive 10 is a triangular primitive that is defined by three vertices 12–14. Each of the vertices 12–14 has a corresponding normal vector 62–64, wherein the vector 62–64 for each vertex 12–14 indicates a normal to the non-planar surface at its corresponding vertex location. Each of the vertices 12–14 is defined in terms of a location in a three-dimensional coordinate space. The edges 18–20 connect the vertices of the high-order primitive 10 to form a boundary of the high-order primitive 10.

Thus, in a video graphics processing system that supports high-order primitives 10 in accordance with the present invention, the central processor can issue commands to draw high-order triangles 10, which are defined by three vertices 12–14 and three corresponding normals 62–64, to subsequent circuitry that tessellates the high-order triangles 10 to produce planar triangles for subsequent processing. In some embodiments, the central processor may also produce other types of high-order primitives, such as a high-order or curved line that is defined by two vertices and two normals, where tessellation of the line results in a number of low order lines or segments that are subsequently processed by the 3D pipeline. In some embodiments, the central processor may also produce planar or low-order primitives that do not require any tessellation. In such instances, the circuitry that performs the tessellation may receive an indication, or determine based on the data received, that tessellation is not to occur, and in such cases, the circuitry simply passes these low-order primitives on to the 3D pipeline for subsequent processing.

In order to tessellate a high-order triangle 10 to produce a number of planar triangles, a cubic Bezier triangular control mesh is preferably generated to determine the three dimensional (3D) coordinates for vertices of planar primitives resulting from tessellation. Generation of a cubic Bezier triangular control mesh is accomplished by evaluating a Bernstein polynomial or another function that utilizes such a control mesh to determine 3D coordinates for vertices of tessellated primitives. Such evaluation of a Bernstein polynomial to derive position coordinates of tessellated primitive vertices is described in detail below.

Figure 2:
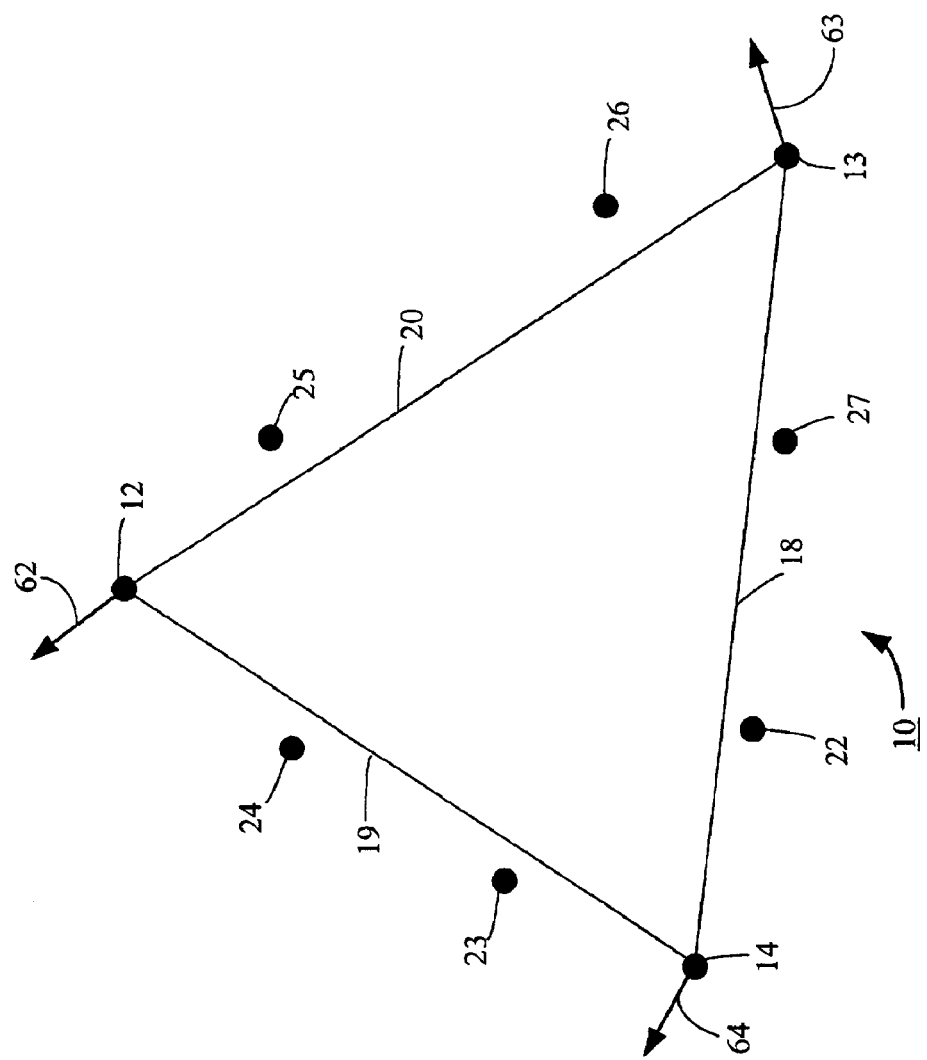
FIG. 2 illustrates a graphical representation of the video graphics primitive of FIG. 1 together with a number of control points associated with a cubic Bezier triangular control mesh in accordance with a particular embodiment of the present invention.

Generation of a cubic Bezier triangular control mesh begins by calculating two control points that relate to each edge 18–20 of the high-order primitive 10 based on the vertex parameters of the vertices that define that edge 18–20. FIG. 2 shows a top down view of the high-order primitive 10 in which the vertices 12–14 of the primitive 10 are co-planar, and illustrating control points 22–27 that may or may not lie within a plane and/or a boundary of the high-order primitive 10 defined by the vertices 12–14. The positions of control points 27 and 22, which relate to edge 18, are calculated based on the positions of vertices 13 and 14 and their corresponding normal vectors 63, 64. Similarly, the positions of control points 24 and 23, which relate to edge 19, are calculated based on the positions of vertices 12 and 14 and their corresponding normal vectors 62, 64. Likewise, the positions of control points 25 and 26, which relate to edge 20, are calculated based on the positions of vertices 12 and 13 and their corresponding normal vectors 62, 63. Thus, the control points that relate to a particular edge are determined based on the positions and normals of the two vertices that define the particular edge. The relationship between the control points along an edge and the vertices that define that edge can be exploited in video graphics systems where neighboring high-order video graphics primitives share an edge, thus providing a means for reducing the total number of calculations that need to occur by reusing some control point calculations. Such calculation reuse is described in additional detail below with respect to FIG. 12.

FIG. 3 illustrates a graphical representation of a first technique for calculating a control point 22 that relates to an edge 18 based on the vertices 13, 14 that define the edge 18. The perspective provided by FIG. 3 differs from that shown in FIG. 2. The perspective provided in FIG. 3 may be a side view of the high-order video graphics primitive 10 where the plane that includes vertices 13 and 14 lies in a generally horizontal orientation.

In order to determine the coordinates for the control point 22, a plane 502 that is defined by the normal vector 64 corresponding to vertex 14 is used. The normal vector 64 is normal to the plane 502. Vertex 13 is projected onto the plane 502 to determine a reference point 522. Projection of vertex 13 is performed in a direction parallel to the normal 64 corresponding to vertex 14. The reference point 522 and vertex 14 define a reference segment. A fraction of the length of the reference segment is then used to define a subsegment 523 that originates at vertex 14 and extends along the reference segment. In one embodiment, the fraction is approximately equal to one-third. In other embodiments, the fraction may be within a range of one-quarter to one-half. The end of the sub-segment defines the control point 22. This technique for determining the control points is preferred for maintaining sharp curvatures in the non-planar primitive 10 such that a tight curve is not overly extended.

FIG. 4 illustrates a graphical illustration of the use of the technique described above with respect to FIG. 3 for determining the location of control point 23 in terms of its three-dimensional (3D) coordinates. Note that the perspective is along the edge 19 that is defined by vertices 12 and 14. Plane 502 is the reference plane defined as normal to the normal vector 64 corresponding to vertex 14. Vertex 12 is projected onto the reference plane 502 to produce a reference point 532. The projection of vertex 12 is in a direction parallel to the normal 64 corresponding to vertex 14. A sub-segment 533 is defined using a fraction of the length of the reference segment defined by the reference point 532 and vertex 14. The end of the sub-segment 533 determines the location of control point 23.

FIGS. 5 and 6 provide illustrations similar to those of FIGS. 3 and 4, except that a slightly different technique is used for determining the coordinates of the control points 22, 23. In FIG. 5, a segment 43 having a predetermined length is determined based on the length of edge 18. The segment 43 is mapped onto the plane 502 defined by the normal vector 64 of a particular vertex 14 of edge 18, such that the segment 43, the normal vector 64, and edge 18 are all co-planar. A first end of the segment 43 as mapped corresponds to vertex 14, and a second end of the segment defines the control point 22. The length of the segment 43 is a fraction of the length of the edge 18 defined by vertices 13 and 14, wherein the fraction may be within a range between one-quarter and one-half. In one embodiment, the length of the segment 43 is approximately equal to one-third of the length of edge 18. In other embodiments, the fraction may be specified by a user. A register may be used to store the fraction for use in the computations.

FIG. 6 illustrates a determination of the coordinates for control point 23, wherein a segment 45 is mapped onto plane 502 such that the segment 45 is co-planar with edge 19 and normal 64. Once again, the length of the segment 45 is equal to a fraction of the length of edge 19.

Figure 7:
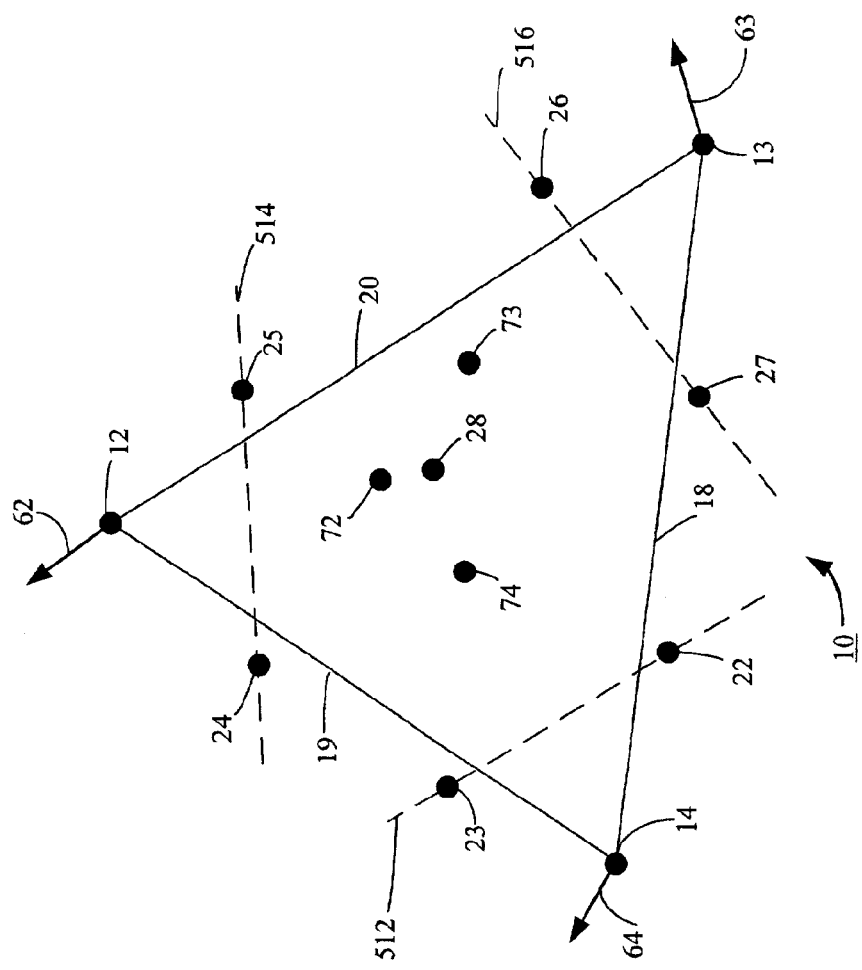
FIG. 7 illustrates a graphical representation of the non-planar video graphics primitive and a technique for determining the central control point for the cubic Bezier triangular control mesh in accordance with a particular embodiment of the present invention.

Once the control points 22–27 related to each of the edges 18–20 have been determined, a central control point 28 is determined. FIG. 7 illustrates a graphical representation of the determination of the central control point 28 using a first technique. The position of the central control point 28 is computed using a weighted calculation based on at least some of the original vertices 12–14 of the high-order primitive 10 and the control points 22–27 related to the edges 18–20. In some embodiments, the combination of the original vertices 12–14 and the control points 22–27 may be based on user-specified combining parameters that determine the weighting of the components. In a particular embodiment, each of the three vertices 12–14 of the high-order primitive 10 is reflected through a corresponding line defined by a pair of control points. For example, control points 22 and 23, which are the control points closest to vertex 14, define line 512. By reflecting vertex 14 through line 512, a reference point 74 can be determined. A similar projection of vertex 12 through line 514 defined by control points 24 and 25 produces reference point 72. Likewise, reflecting vertex 13 through line 516 defined by control points 26 and 27 produces reference point 73.

In order to determine the three-dimensional coordinates for the central control point 28, the coordinates of the reference points 72–74 are averaged. Thus, the x-coordinate for the central control point 28 is equal to the sum of the x-coordinates for the reference points 72–74 divided by three. Similar calculations are performed for the y, z and w-coordinates to obtain the full set of coordinates for the central control point 28. For each coordinate, this technique can be simplified to an equation:

Central Control Point Coordinate Value=⅓(Sum of the corresponding coordinate values of the other control points 22–27)–⅓ (Sum of the corresponding coordinate values of the vertices 12–14)

In another embodiment, the weighted calculation used to determine the coordinates of the central control point 28 produces the equation:

Central Control Point=¼(Sum of the other control points 22–27)– ⅙ (Sum of the vertices 12–14)

As is apparent to one of ordinary skill in the art, different weighting factors for the coordinate values of the vertices 12–14 and the other control points 22–27 can be used to determine the coordinate values of the central control point 28 based on the needs of the system or application.

Figure 8:
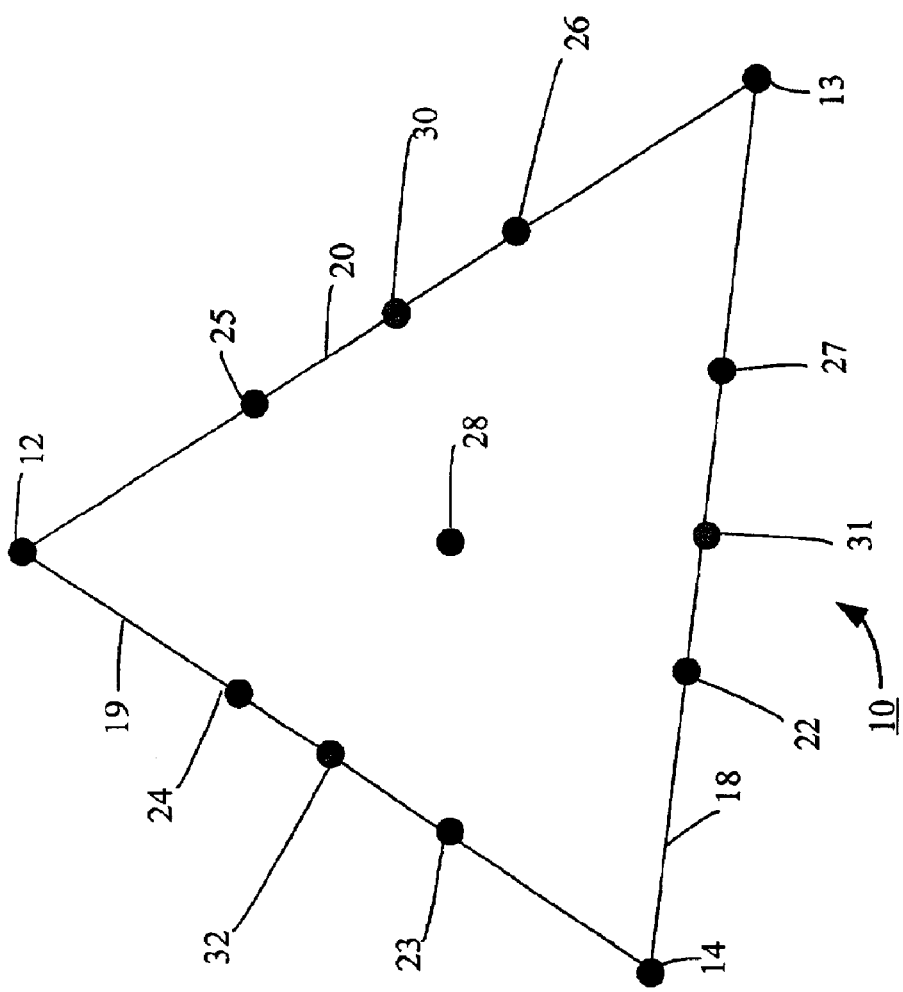
FIG. 8 illustrates a representation in barycentric coordinate space of the non-planar video graphics primitive and control points that make up a cubic Bezier triangular control mesh and a quadratic Bezier triangular control mesh determined in accordance with a particular embodiment of the present invention.

Once the coordinates of the central control point 28 have been determined, determination of the cubic Bezier triangular control mesh is complete. Referring to FIG. 8, which is in barycentric coordinate space, the coordinates of the vertices corresponding to points 12–14 and the control points corresponding to points 22–28 define the complete cubic Bezier triangular control mesh.

Similar to the generation of control points corresponding to points 22–28 for use in computing the position components of the vertices of the tessellated or planar graphics primitives, additional control points corresponding to points 30–32 are generated for use in computing the normal control components (or normals) of the vertices of the tessellated primitives. The following equations are used to generate the control points corresponding to points 30–32:

$CP_{30}=N_{1213}+2(E_{20} \cdot N_{1213})E_{20}$ $CP_{31}=N_{1413}+2(E_{18} \cdot N_{1413})E_{18}$ $CP_{32}=N_{1214}+2(E_{19} \cdot N_{1214})E_{19}$, where $N_{1213}=\frac{1}{2}(N_{12}+N_{13})$, $N_{1413}=\frac{1}{2}(N_{14}+N_{13})$, $N_{1214}=\frac{1}{2}(N_{12}+N_{14})$, $E_{20}=(V_{12}-V_{13})/|V_{12}-V_{13}|$, $E_{18}=(V_{14}-V_{13})/|V_{14}-V_{13}|$, $E_{19}=(V_{12}-V_{14})/|V_{12}-V_{141}|$, $N_{12}$ is the normal 62 corresponding to vertex 12, $N_{13}$ is the normal 63 corresponding to vertex 13, $N_{14}$ is the normal 64 corresponding to vertex 14, $V_{12}$ is the position of vertex 12, $V_{13}$ is the position of vertex 13, $V_{14}$ is the position of vertex 14, $CP_{30}$ is control point 30, $CP_{31}$ is control point 31, and $CP_{32}$ is control point 32.

Once the cubic and quadratic Bezier triangular control meshes have been determined, tessellation can be achieved by using the control meshes as inputs to respective Bernstein polynomials or any other algorithm for evaluating Bezier surfaces. Other algorithms for evaluating Bezier surfaces include the de Casteljau algorithm, blossoms and any other method for evaluating Bezier surfaces. The Bernstein polynomial for determining the position coordinates of the vertices of the tessellated primitives provides that if given the control points $P_{ijk}$, such that the sum of i, j, and k equals 3 (i+j+k=3) and the product of i, j, and k is greater than or equal to zero (ijk≧0), a cubic Bezier triangle is defined as $$B(u, v, w) = \sum P_{ijk} \frac{6}{i!j!k!} u^i v^j w^k, \text{ where } u+v+w=1.$$

The Bernstein polynomial for determining the normal components of the vertices of the tessellated primitives provides that if given the control points $N_{ijk}$, such that the sum of i, j, and k equals 2 (i+j+k=2) and the product of i, j, and k is greater than or equal to zero (ijk≧0), a quadratic Bezier triangle is defined as $$B(u, v, w) = \sum N_{ijk} \frac{2}{i!j!k!} u^i v^j w^k, \text{ where } u+v+w=1.$$

Figure 9:
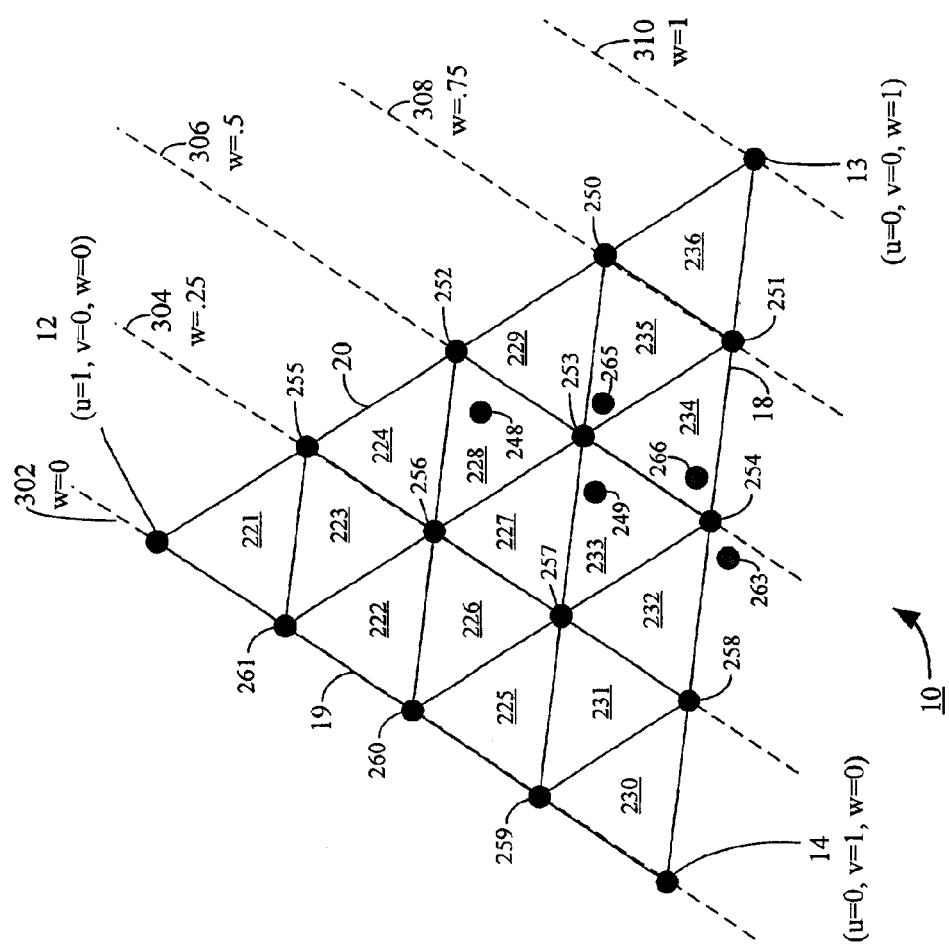
FIG. 9 illustrates a graphical representation of the use of barycentric coordinates for evaluating a Bernstein polynomial to derive the positions of vertices associated with tessellated primitives in accordance with a particular embodiment of the present invention.

The Bernstein polynomials rely on calculations based on barycentric coordinates (u, v, w), wherein barycentric coordinates define an internal reference space for the high-order primitive 10. For barycentric coordinates, the sum of the coordinates for a particular point within the primitive 10 is equal to one. Thus, u+v+w=1 at each set of (u, v, w) or barycentric coordinates within the primitive 10. Referring to FIG. 9, each of the vertices 12–14 is a reference point for a particular barycentric coordinate. At vertex 12, the first barycentric coordinate (u) is equal to one; whereas the second and third barycentric coordinates (v and w) are equal to zero. At vertex 14, the second barycentric coordinate (v) is equal to one; whereas the first and third barycentric coordinates (u and w) are equal to zero. At vertex 13, the third barycentric coordinate (w) is equal to one; whereas the first and second barycentric coordinates (u and v) are equal to zero. Use of barycentric coordinates in video graphics processing applications is well known in the art.

In order to efficiently evaluate the Bernstein polynomials, the points at which the polynomials are to be evaluated are selected along lines in which one of the barycentric coordinates is constant. Such lines are referred to herein as "iso-parametric lines" and are illustrated in FIG. 9 as lines 302–310. Each iso-parametric line 302–310 includes one or more vertices of a particular planar tessellated primitive 221–236 that is to be generated based on the high-order primitive 10. The benefit of evaluating the Bernstein polynomial along iso-parametric lines is that the Bernstein polynomials can be reduced to single variable equations. For example, iso-parametric lines 302–310 are lines in which the third barycentric coordinate (w) is constant. Thus, the condition u+v+w=1 reduces to u+v=K, where K is a constant equal to one minus the value of w. Accordingly, the value of the v-coordinate equals the value of K minus the value of the u-coordinate and the equations defining cubic and quadratic Bezier triangles can be reduced to:

$$B_1(u) = \sum P_{ijk} \frac{6}{i!j!k!} u^i (K-u)^j w^k, \text{ and}$$

$$B_2(u) = \sum N_{ijk} \frac{2}{i!j!k!} u^i (K-u)^j w^k, \text{ where } w \text{ is a constant.}$$

Along line 302, the third barycentric coordinate is not only constant, but also equal to zero (i.e., w=0). Therefore, the Bernstein polynomials can be further simplified to:

$$B_1(u) = \sum P_{ijk} \frac{6}{i!j!k!} u^i (1-u)^j w^k, \text{ and}$$

$$B_2(u) = \sum N_{ijk} \frac{2}{i!j!k!} u^i (1-u)^j w^k.$$

Line 304 represents a line along which the third barycentric coordinate (w) is equal to one-fourth, line 306 represents a line along which the third barycentric coordinate is equal to one-half, and line 308 represents a line along which the third barycentric coordinate is equal to three-fourths. By definition, line 310, which intersects vertex 13, represents a line along which the third barycentric coordinate is equal to one.

To compute the position components of vertices (e.g., vertex 253) that lie along an iso-parametric line (e.g., line 306), but do not lie along an edge 18–20 of the high-order primitive 10, supplemental control points 248, 249, 252, and 263 relating to the particular iso-parametric line 306 are first preferably generated. The supplemental control points include one vertex (e.g., vertex 252 for line 306) of a tessellated primitive that lies along an edge (e.g., edge 20) and additional control points (e.g., control points 248, 249, and 263) that are generated using the original position control points 22–28 and predetermined weighting factors as described in more detail below. Similarly, to compute the normal components of vertices that lie along an iso-parametric line (e.g., line 306), but do not lie along an edge 18–20 of the high-order primitive 10, supplemental control points 252, 265, and 266 relating to the particular iso-parametric line 306 are first preferably generated. The supplemental control points include one vertex (e.g., vertex 252 for line 306) of a tessellated primitive that lies along an edge (e.g., edge 20) and additional control points (e.g., control points 265 and 266) that are generated using the original normal control points 30–32 and predetermined weighting factors as described in more detail below with respect to FIG. 14.

Figure 10:
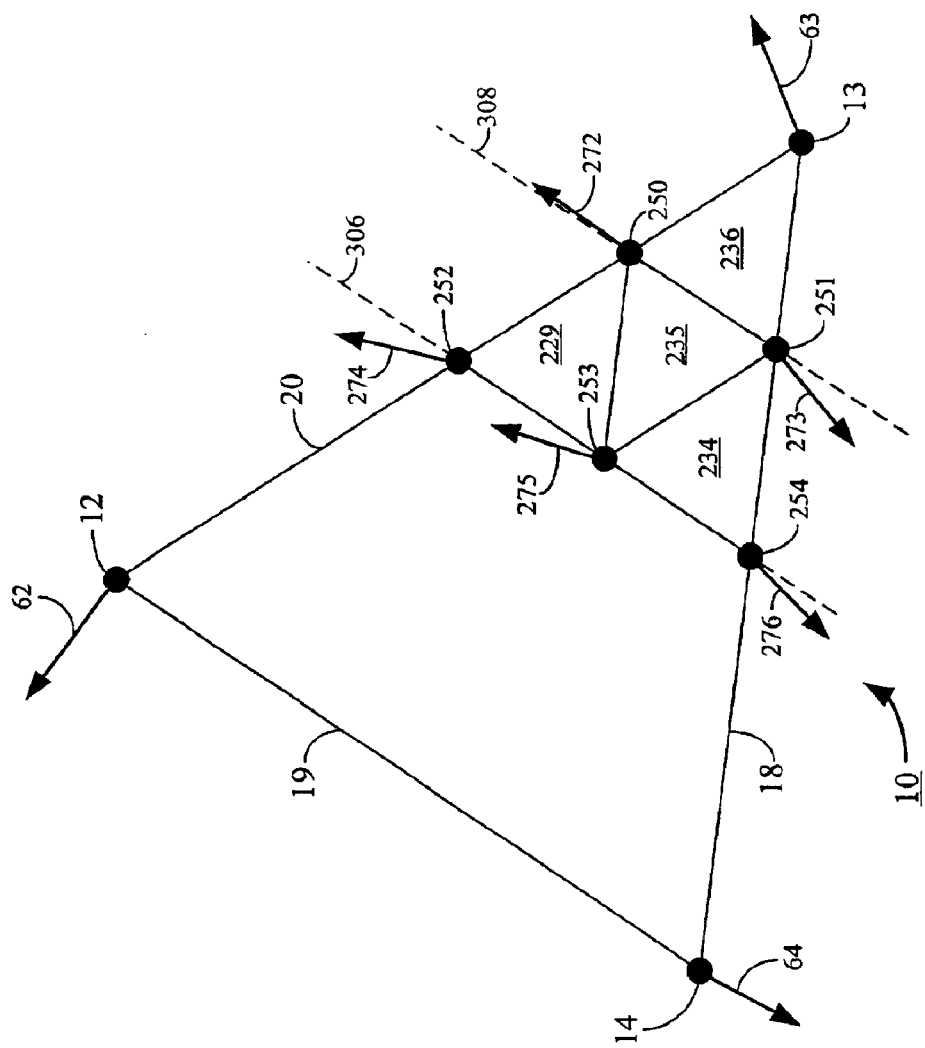
FIG. 10 illustrates a subset of the planar tessellated primitives illustrated in FIG. 9 and normals associated with vertices of the subset of tessellated primitives as determined in accordance with a particular embodiment of the present invention.

FIG. 10 illustrates tessellated primitives 229 and 234–236 resulting from tessellation of the high-order video graphics primitive 10. In order to determine the normal vectors 272–276 associated with the newly generated vertices 250–254 of tessellated primitives 229 and 234–236, quadratic interpolation is preferably used, in contrast to the cubic interpolation that is preferably used to obtain the position coordinates of the vertices 250–261 of the tessellated primitives 221–236. Typically, calculation of the normal vectors 272–276 for each of the newly generated vertices 250–254 includes normalization of the results produced through interpolation by a magnitude of the particular normal vector 272–276. Thus, normal vector 272 may be derived by quadratically interpolating between normal vectors 62 and 63, and then normalizing by the magnitude of normal vector 272. Normal vector 273 may be determined by quadratically interpolating between normal vectors 63 and 64, and then normalizing by the magnitude of normal vector 273. Normal vector 275 may require quadratic interpolation utilizing all three of the original normal vectors 62–64 corresponding to the original vertices 12–14 of the high-order primitive 10. Derivation of the new normal vectors 272–276 is preferably accomplished through evaluation of an appropriate Bernstein polynomial as set forth above. A preferred hardware determination of normal vectors 272–276 is described below with respect to FIG. 14.

If additional normal vector accuracy is desired, higher-order interpolation, such as cubic interpolation, may alternatively be used. Further, linear interpolation with or without re-normalization may be used if high-order interpolation is not desired and lower accuracy can be tolerated. This gives a closer approximation to Phong shading.

Other attributes that may be interpolated for each new vertex 250–261 of the tessellated primitives 221–236 include texture coordinates, color data values, and fog data values. Thus, if the central processor provides a high-order video graphics primitive 10 that includes texture data coordinates corresponding to each of the vertices 12–14 of the high-order primitive 10, linear or higher-order interpolation operations can be performed on the texture coordinates to derive similar texture coordinates for each new vertex 250–261 of the tessellated primitives 221–236. The calculations used to determine the various attributes for each of the new vertices 250–261 of the tessellated primitives 221–236 are preferably performed based on the barycentric coordinates of the vertices 250–261, which allows for simplification of the calculations.

One of ordinary skill in the art will appreciate that many tessellated primitives share edges with other tessellated primitives. For example, the tessellated primitive 235 defined by vertices 250, 251 and 253 shares an edge with the tessellated primitive 229 defined by vertices 250, 252 and 253. Thus, when tessellation is occurring, the evaluation of the Bernstein polynomial used to derive the coordinates of vertex 250 of tessellated primitive 235 can be reused as a part of the determination of the vertices 250, 252 and 253 of tessellated primitive 229. Thus, the order in which the position, normal and attribute components for each new vertex 250–261 of the tessellated primitives 221–236 are determined can be, and preferably is, structured such that maximum reuse of calculations is possible. In a preferred embodiment, as described briefly above and in more detail below with respect to FIG. 14, the position, normal and attribute components for each new vertex 250–261 of the tessellated primitives 221–236 are determined along iso-parametric lines 302–310 to facilitate maximum reuse of calculations.

Figure 11:
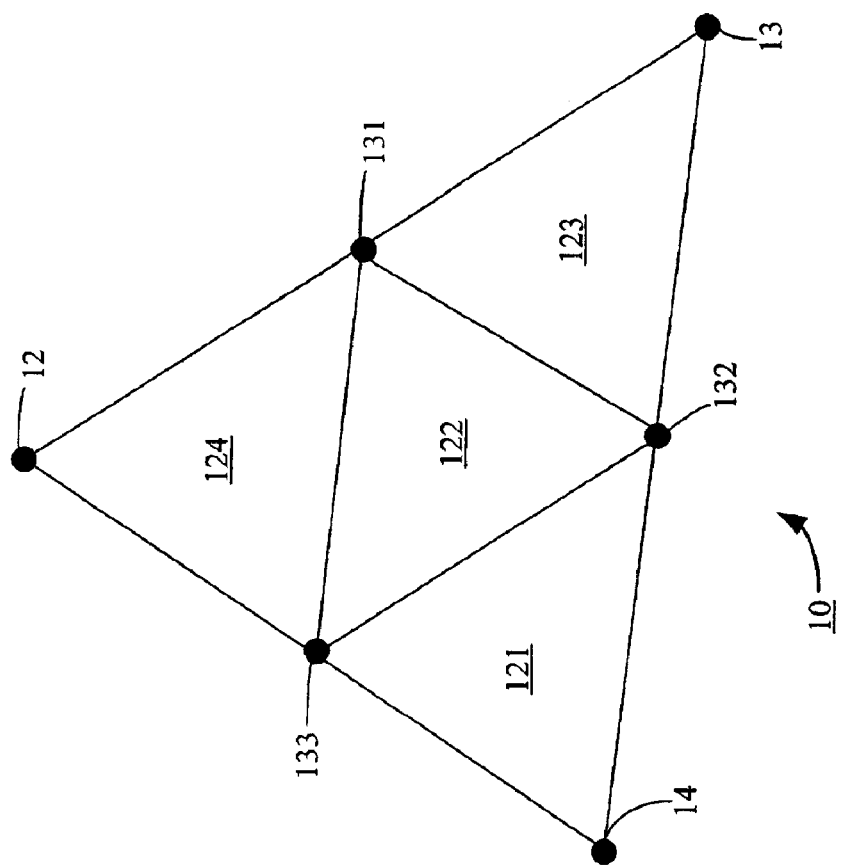
FIG. 11 illustrates a graphical representation of a set of planar video graphics primitives resulting from level one tessellation of the non-planar video graphics primitive in accordance with a particular embodiment of the present invention.

The number of video graphics primitives produced through tessellation is determined based on a tessellation level provided by the central processor or stored in a tessellation level register within the circuitry performing the tessellation. FIG. 11 illustrates a set of tessellated video graphics primitives 121–124 derived from the high-order video graphics primitive 10 illustrated in FIG. 1 for a tessellation level of one. The tessellation level for the set of tessellated primitives 121–124 in FIG. 11 is less than the tessellation level associated with the tessellation shown in FIG. 9 wherein FIG. 9 shows a tessellation level of three. The tessellation level is the number of new vertices generated corresponding to each edge of an input triangle. The greater the tessellation level, the greater the number of tessellated primitives used to construct the high-order graphics primitive 10. The tessellated primitives 121–124 are defined by both the original vertices 12–14 of the high-order video graphics primitive 10 and the new vertices 131–133. For example, for a tessellation level of one, the Bernstein polynomials are evaluated at the following u, v, and w values to derive the position and normal components of the new vertices 131–133 of tessellated primitives 121–124: (0.5, 0.5, 0), (0.5, 0. 0.5), and (0, 0.5, 0.5). For a tessellation level of two, the Bernstein polynomials are evaluated at the following u, v, and w values to derive the position and normal components of the new vertices (i.e., the vertices other than the original vertices 12–14 of the high-order primitive 10) of the tessellated primitives: (0.67, 0.33, 0), (0.67, 0, 0.33), (0.33, 0.67, 0), (0.33, 0.33, 0.33), (0.33, 0, 0.67), (0, 0.67, 0.33), and (0, 0.33, 0.67).

As discussed in more detail below with respect to FIG. 14, a tessellation hardware implementation may be optimized to substantially reduce the number of processing cycles required to compute the position, normal and attribute components for the vertices of tessellated primitives for lower tessellation levels (e.g., for tessellation levels of one or two). Such an optimized lower-level tessellation methodology enables the components of the new vertices to be determined directly from the positions and normals 62–64 of the original high-order primitive vertices 12–14 without resort to the use of control points 22–28, 30–32. That is, instead of computing position and normal control points 22–28, 30–32 in addition to the original vertices 12–14 themselves and determining vertex components for each new vertex along iso-parametric lines, the positions and normal components of the new vertices 131–133 may be derived directly from the positions and normals 62–64 of the original vertices 12–14. The positions of the new vertices 131–133 for level one tessellation may be determined from the following equations:

$$V_{131} = \tfrac{1}{2}(V_{13}+V_{12}) + \tfrac{1}{8}[(V_{13} \cdot N_{13})N_{13} + (V_{12} \cdot N_{12})N_{12} - (V_{13} \cdot N_{12})N_{12} - (V_{12} \cdot N_{13})N_{13}],$$

$$V_{132} = \tfrac{1}{2}(V_{14}+V_{13}) + \tfrac{1}{8}[(V_{13} \cdot N_{13})N_{13} + (V_{14} \cdot N_{14})N_{14} - (V_{13} \cdot N_{14})N_{14} - (V_{14} \cdot N_{13})N_{13}], \text{ and}$$

$$V_{133} = \tfrac{1}{2}(V_{14}+V_{12}) + \tfrac{1}{8}[(V_{12} \cdot N_{12})N_{12} + (V_{14} \cdot N_{14})N_{14} - (V_{14} \cdot N_{12})N_{12} - (V_{12} \cdot N_{14})N_{14}],$$

where $V_{131}$ is the position component (in x, y, z-coordinates) of new vertex 131, $V_{132}$ is the position component of new vertex 132, $V_{133}$ is the position component of new vertex 133, $V_{12}$ is the position component of vertex 12, $V_{13}$ is the position component of vertex 13, $V_{14}$ is the position component of vertex 14, $N_{12}$ is the normal component or vector 62 of vertex 12, $N_{13}$ is the normal component 63 of vertex 13, and $N_{14}$ is the normal component 64 of vertex 14.

The above equations for determining the positions of vertices 131–133 ($V_{131}$–$V_{133}$) can be rewritten in simplified form respectively as follows:

$$V_{131} = \tfrac{1}{2}(V_{13}+V_{12}) + \tfrac{1}{8}[(E_{20} \cdot N_{13})N_{13} - (E_{20} \cdot N_{12})N_{12}],$$

$$V_{132} = \tfrac{1}{2}(V_{14}+V_{13}) + \tfrac{1}{8}[(E_{18} \cdot N_{14})N_{14} - (E_{18} \cdot N_{13})N_{13}], \text{ and}$$

$$V_{133} = \tfrac{1}{2}(V_{12}+V_{14}) + \tfrac{1}{8}[(E_{19} \cdot N_{12})N_{12} - (E_{19} \cdot N_{14})N_{14}],$$

where $E_{18} = V_{13} - V_{14}$, $E_{19} = V_{12} - V_{14}$, and $E_{20} = V_{13} - V_{12}$.

In such a simplified form, the equations for determining the positions of vertices 131–133 mathematically represent one-eighth of the scaled difference between the projections of the edge 18–20 between any two consecutive original vertices 12–14 onto the normal components of the consecutive original vertices in a clockwise direction summed with an average of the positions of the two consecutive original vertices. For example, the simplified equation for $V_{131}$ represents one-eighth the scaled difference between the projection of edge 20 onto the plane defined by vertex 13 and its normal vector 63, and the projection of edge 20 onto the plane defined by vertex 12 and its normal vector 62 in the direction of vertex 13 summed with an average of the positions of vertices 12 and 13. Similarly, the simplified equation for $V_{132}$ represents one-eighth the scaled difference between the projection of edge 18 onto the plane defined by vertex 14 and its normal vector 64, and the projection of edge 18 onto the plane defined by vertex 13 and its normal vector 63 in the direction of vertex 14 summed with an average of the positions of vertices 13 and 14. Likewise, the simplified equation for $V_{133}$ represents one-eighth the scaled difference between the projection of edge 19 onto the plane defined by vertex 12 and its normal vector 62, and the projection of edge 19 onto the plane defined by vertex 14 and its normal vector 64 in the direction of vertex 12 summed with an average of the positions of vertices 12 and 14. Thus, using the above equations, the positions and normal components of the new vertices 131–133 for level one tessellation may be derived without generating control points, thereby saving processing cycles and improving graphics hardware processing throughput.

The normal components of the new vertices 131–133 for level one tessellation may be determined from the following equations, where $N_{131}$–$N_{133}$ are the normal components for new vertices 131–133, $V_{12}$–$V_{14}$ are the respective position components of original vertices 12–14, and $N_{12}$–$N_{14}$ are the respective normal vectors 62–64 of original vertices 12–14:

$$N_{131} = \tfrac{1}{2}(N_{13}+N_{14}) - \tfrac{1}{8}[E_{18} \cdot N_{13} + E_{18} \cdot N_{14}][E_{18}/|E_{18}|^2],$$

$$N_{132} = \tfrac{1}{2}(N_{12}+N_{13}) - \tfrac{1}{8}[E_{20} \cdot N_{12} + E_{20} \cdot N_{13}][E_{20}/|E_{20}|^2], \text{ and}$$

$$N_{133} = \tfrac{1}{2}(N_{12}+N_{14}) - \tfrac{1}{8}[E_{19} \cdot N_{12} + E_{19} \cdot N_{14}][E_{19}/|E_{19}|^2],$$

where $E_{18} = V_{13} - V_{14}$, $E_{19} = V_{12} - V_{14}$, and $E_{20} = V_{13} - V_{12}$.

Figure 12:
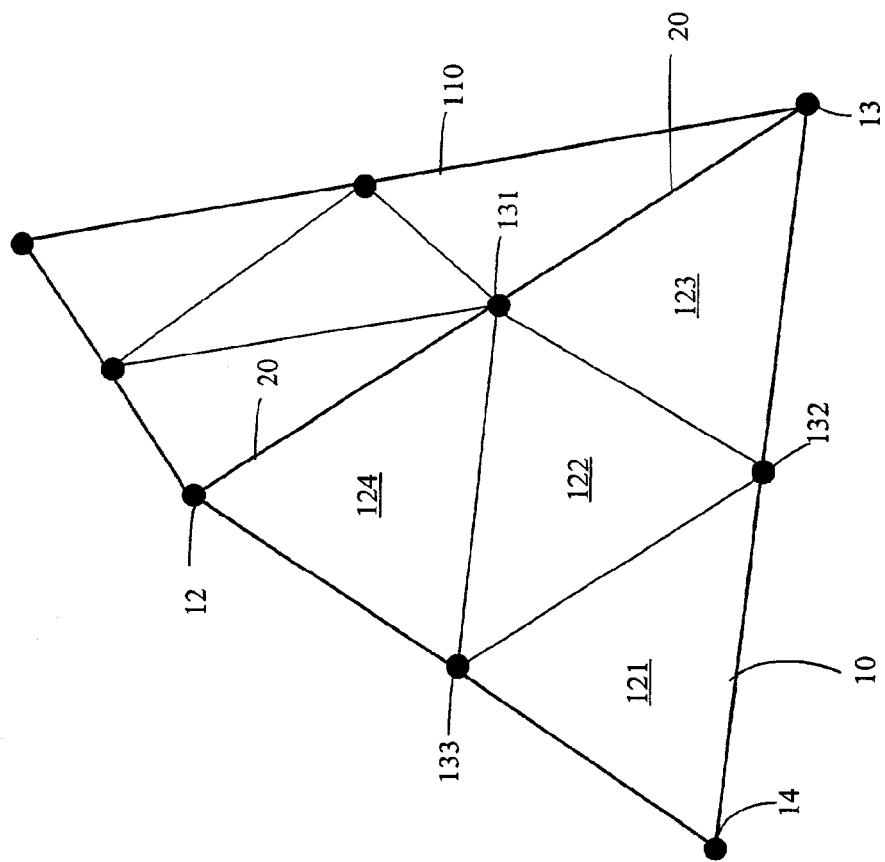
FIG. 12 illustrates the planar video graphics primitives resulting from tessellation of the video graphics primitive of FIG. 11 together with a set of planar video graphics primitives resulting from tessellation of a neighboring non-planar video graphics primitive in accordance with a particular embodiment of the present invention.

FIG. 12 illustrates a high-order video graphics primitive 110 that neighbors high-order video graphics primitive 10 along edge 20. In many cases, some or all of the calculations used to determine the control points 12, 13, 25, 26 that relate to edge 20 for high-order primitive 10 (as well as calculations used to determine vertex parameters for certain vertices, such as vertex 131, that lie along edge 20) can be reused in the tessellation operation of high-order video graphics primitive 110. This is especially true if the tessellation level used for tessellating high-order video graphics primitive 110 is the same as the tessellation level used to tessellate high-order video graphics primitive 10. Since neighboring high-order video graphics primitives 10, 110 are typically presented to the circuitry performing the tessellation in a close temporal order, a limited amount of buffering circuitry may be required to ensure that the values resulting from calculations along or relating to a common edge 20 of two high-order video graphics primitives 10, 110 can be stored for potential future reuse.

The resulting primitives produced through tessellation are provided to the 3D pipeline as planar primitives. Each of the vertices of each planar triangle primitive may be presented to the 3D pipeline along with a planar primitive vertex normal and possibly other vertex attributes corresponding to texture coordinates, color data, and/or fog data. The planar primitive vertex normal for each planar primitive may be normalized after the interpolation operations used to derive such planar primitive vertex normals.

Figure 13:
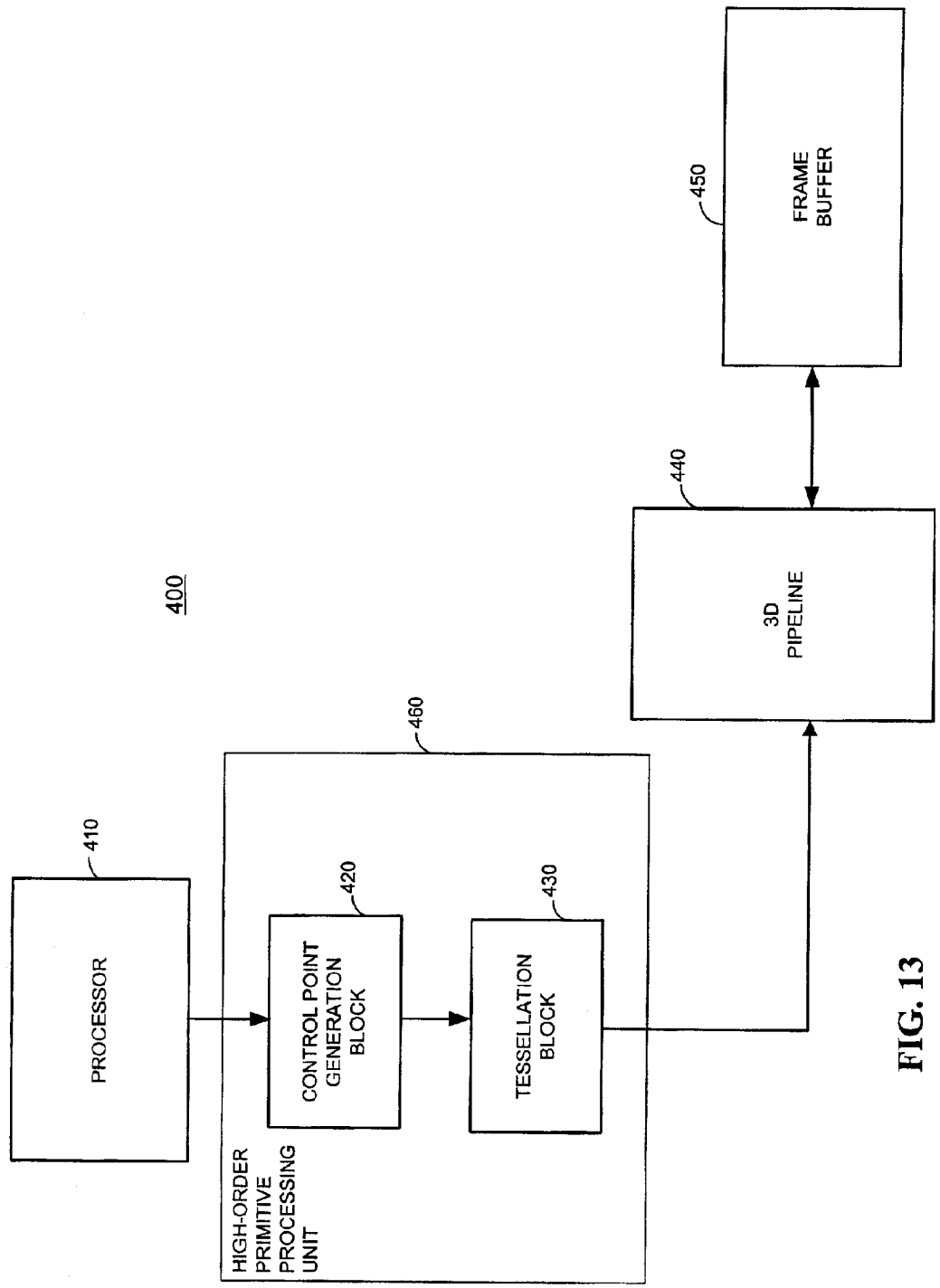
FIG. 13 illustrates a block diagram of a video graphics processing system that includes a high-order primitive processing unit in accordance with a particular embodiment of the present invention.

FIG. 13 illustrates a high-level block diagram of a video graphics processing system 400 in accordance with a particular embodiment of the present invention. The video graphics processing system 400 includes a processor 410, a control point generation block 420, a tessellation block 430, a 3D pipeline 440, and a frame buffer 450. The processor 410 may be the central processor of a computer system or any other processing unit or group of processing units that generates high-order video graphics primitives corresponding to objects for display. Each high-order graphics primitive produced by the processor 410 is defined at least by the three-dimensional (3D) coordinates of its vertices as well as a normal vector corresponding to each vertex. Thus, for a triangular high-order video graphics primitive 10, at least the position coordinates and the normal vectors 62–64 for each of the three vertices 12–14 of the primitive are produced by the processor 410.

The control point generation block 420 receives the high-order video graphics primitives 10 from the processor 410 and generates one or more control meshes corresponding to each high-order video graphics primitive. For example, the control point generation block 420 preferably generates two Bezier control meshes, one for use in computing vertex position components of the tessellated primitives and the other for computing the normal components or vectors of the tessellated primitives. In the case of triangle primitives, the position Bezier control mesh is preferably a cubic Bezier triangular control mesh; whereas, the normal Bezier control mesh is preferably a quadratic Bezier triangular control mesh. The operations performed by the control point generation block 420 include those for generating all the position and normal control points 22–28, 30–32, including generating additional points that are various combinations of the position and normal control points 22–28, 30–32. These additional points are used to compute supplemental control points 248, 249, 263, 265, and 266 related to the iso-parametric lines 302–310 as was briefly discussed above with respect to FIG. 9 and is described in more detail below with respect to FIG. 14. In order to perform vector calculations, the control point generation block 420 is preferably coupled to, or includes, at least one vector engine that performs calculations associated with generating the control meshes.

Based on the control meshes generated by the control point generation block 420, the tessellation block 430 tessellates each high-order video graphics primitive to produce a group of low-order planar primitives. The level of tessellation performed by the tessellation block 430 may be based on information received from the processor 410 or based on a tessellation level that may be configured for the video graphics processing system. The control point generation block 420 and the tessellation block 430 together form part of a high-order primitive processing unit 460 and are preferably implemented in hardware residing on a video graphics card. Alternatively, both blocks 420, 430 may be implemented in software executed by the processor, although such an implementation may result in reduced processing speed as compared to the preferred hardware implementation. A preferred hardware implementation of the high-order primitive processing unit 460, including control point generation block 420 and tessellation block 430, is described in detail below with respect to FIGS. 14 and 15.

Tessellation by the tessellation block 430 includes at least a determination as to the position coordinates for each of the vertices of the planar video graphics primitives resulting from tessellation. These coordinates may be determined by using a cubic Bezier control mesh to evaluate the Bernstein polynomial or other algorithm at various points within the high-order video graphics primitive 10 based on the tessellation level. The evaluation of the Bernstein polynomial preferably utilizes barycentric coordinates in order to simplify calculations. Additional vertex parameters corresponding to the vertices of each of the planar video graphics primitives may also be determined. These vertex parameters can include normal vectors, which are preferably based on quadratic interpolation, but may be alternatively based on linear or higher-order interpolation (where the results are normalized), as well as other attributes, such as color data, fog data, and texture coordinate data.

The results produced by the tessellation block 430 are planar primitives that include the appropriate vertex data required for the 3D pipeline 440 to perform known operations, such as transform processing, lighting processing, clipping processing, and rasterization. The 3D pipeline 440 receives the planar primitives and generates pixel data that may be combined with data stored in the frame buffer 450. The data stored in the frame buffer 450 can then be used to generate a display signal that results in an image being drawn on a display. The 3D pipeline 440 may be a conventional 3D pipeline used for processing planar video graphics primitives.

Figure 14:
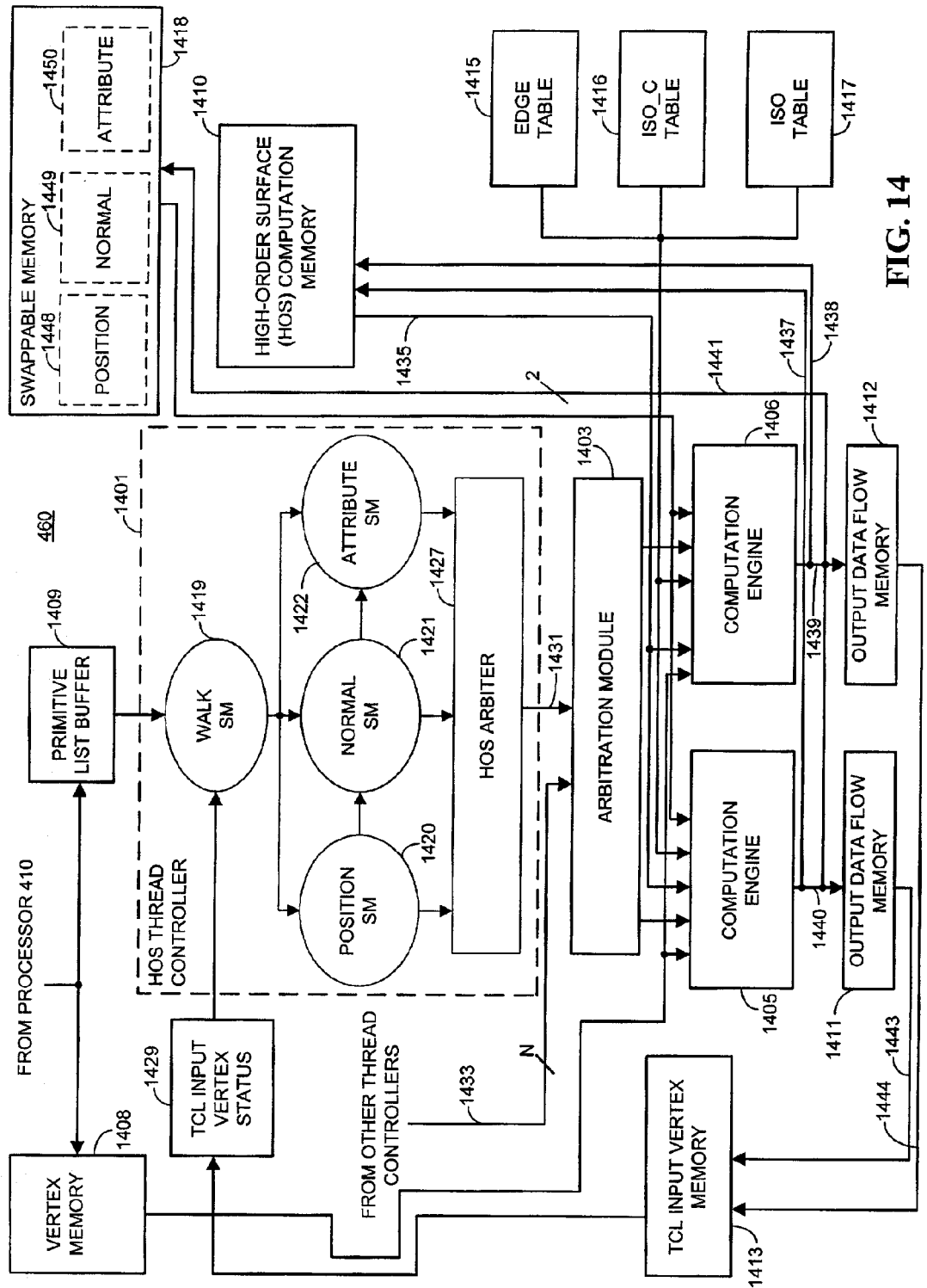
FIG. 14 illustrates a block diagram of a preferred high-order primitive processing unit for use in the video graphics processing system of FIG. 13.

FIG. 14 illustrates a block diagram of a preferred high-order primitive processing unit 460 for use in the video graphics processing system 400 of FIG. 13. The high-order primitive processing unit 460 includes a high-order surface (HOS) thread controller 1401, an arbitration module 1403, one or more computation engines 1405, 1406 (two shown), various memory 1408–1413, a plurality of lookup tables 1415–1417, and a swappable memory 1418. The HOS thread controller 1401 preferably includes a plurality of state machines 1419–1422 and an arbiter 1427. As described in greater detail below, walking state machine 1419 functions as a high level state machine to direct the lower-level position, normal and attribute state machines 1420–1422. The position and normal state machines 1420, 1421 issue commands for computing the position and normal control points 12–14, 22–28, 30–32 and the vertices of the tessellated primitives. The attribute state machine 1422 issues commands for computing the remaining parameters or attributes of the vertices of the tessellated triangles. Each state machine 1419–1422 is preferably implemented in hardware as a logic circuit and a synchronous circuit embodied in an integrated circuit.

In a preferred embodiment, the HOS thread controller 1401, the arbitration module 1403, and the computation engines 1405, 1406 are all implemented in an integrated circuit located on a video graphics card together with the HOS computation memory 1410, the output data flow memories 1411, 1412, the TCL input vertex memory 1413, the lookup tables 1415–1417, the swappable memory 1418, and the TCL input vertex status register 1429. The vertex memory 1408 and the primitive list buffer 1409 may also use memory locations on the video graphics card at the option of the application running on the processor 410.

As discussed in more detail below, the swappable memory 1418 includes respective areas 1448–1450 for temporarily storing control point and other interpolation data for use in computing the positions, normals, and attributes for the supplemental vertices of the tessellated primitives (e.g., primitives 221–236 of FIG. 9). The control point data stored in the swappable memory 1418 includes data for control points 22–28, 30–32, data for the original vertices 12–14 of the high-order primitive 10 when such vertices 12–14 are used as control points, and data for supplemental control points (e.g., vertex 252 and additional control points 248, 249, 263, 265 and 266) used for computing position and normal components of one or more vertices (e.g., vertex 253) that are located within the boundary of the high-order primitive 10 and that lie along iso-parametric lines 302–310. Each area 1448–1450 of swappable memory 1418 is preferably implemented as an arrangement of registers that allow the data to be written into the respective area's memory registers in rows, but be read from the registers in columns. In addition, the swappable memory 1418 is preferably double-buffered. That is, the swappable memory 1418 includes two sections of memory for each memory area 1448–1450. When one section of a memory area 1448–1450 is being read from by one or more of the computation engines 1405, 1406, the other section of the memory area 1448–1450 may be simultaneously written to by one or more of the computation engines 1405, 1406.

During operation, the processor 410 stores vertex parameters for the vertices 12–14 of the high-order primitives 10 in vertex memory 1408. The vertex parameters generally include position components (e.g., x, y, z, and w position coordinates) and normal components (vectors), and may also include various attributes, such as texture coordinates, color data, fog data and/or other attributes. In addition, the processor 410 stores a corresponding list of vertices or vertex indices associated with each high-order primitive 10, an indication (e.g., bitmap) of whether or not the parameters for each vertex of the primitive 10 have been completely stored in the vertex memory 1408, and a tessellation level in a primitive list buffer 1409. Alternatively, the tessellation level may be pre-stored in a register within the HOS thread controller 1401 when the video graphics system utilizes a fixed tessellation level. Thus, the primitive list buffer 1409 preferably indicates which vertices make up the high-order primitive 10, which vertices of the high-order primitive 10 have associated vertex parameters completely stored in the vertex memory 1408, and the tessellation level selected by the processor 410 (e.g., an application running in the processor 410) to construct the high-order primitive 10.

The walking state machine 1419 continually checks the primitive list buffer 1409 and once all the vertex parameters for the vertices 12–14 of the high-order primitive 10 are indicated as being stored in the vertex memory 1408, the walking state machine 1419 begins issuing operation codes to the lower-level state machines 1420–1422 to generate tessellated primitives in accordance with the tessellation level. Each operation code issued by the walking state machine 1419 includes a type of operation to be performed, and may include a source address, a destination address, and a vertex position of one of the higher-order primitive vertices 12–14 in terms of barycentric coordinates. The vertex position is of the form (u, v, w), where each of u, v, and w is an integer greater than or equal to zero and the sum of u, v and w is equal to the tessellation level plus one. The vertex position is used primarily for computing linearly interpolated attributes of the new vertices of the tessellated primitives. The source address is the address of the lookup table 1415–1417 where the data for a particular computation to be performed is stored. The destination address is the address of the TCL input vertex memory 1413, output data flow memory 1411, 1412 or HOS computation memory 1410 where the computation result is to be stored for further processing (e.g., transformation, clipping, and lighting (TCL) processing or use in determining parameters of other vertices of the tessellated primitives). The HOS computation memory 1410 basically serves as an intermediate data flow memory that stores the resultant 1437, 1438 of one or more HOS processing operations performed by the computation engines 1405, 1406 for use in subsequent HOS processing operations to be performed by the computation engines 1405, 1406.

The walking state machine 1419 preferably issues operation codes in such as way as to require the high-order primitive processing unit 460 to generate vertices of tessellated triangles along iso-parametric lines (i.e., lines in which a barycentric coordinate is constant). By generating vertices along iso-parametric lines, vertex parameter computations for such vertices may be optimally used and reused in such a manner as to maximize processing efficiency. That is, in the preferred embodiment, the vertex parameters for each tessellated vertex are computed only once and are used and reused as necessary to complete processing of each tessellated primitive that includes the vertex.

After receiving a particular operation code from the walking state machine 1419, the lower-level state machines 1420–1422 begin issuing series of operation codes and transitioning through one or more states to control the execution of the operation issued by the walking state machine 1419. One or more of the lower-level state machines 1420–1422 may wait for another one of the lower-level state machines 1420–1422 to indicate completion of an operation (e.g., a change of state) before issuing operation codes for its particular state. For example, the normal state machine 1421 preferably waits until it receives a flag from the position state machine 1420 indicating the generation of certain position control points 22–28 before issuing commands or operation codes to generate normal control points 30–32 because computation of the normal control points 30–32 preferably reuses many of the computations carried out to generate the position control points 22–28, thereby reducing computational redundancy and improving processing efficiency.

The operation codes issued by the position state machine 1420 are directed primarily at computing x, y, and z-components of position control points (e.g., control points 12–14, 22–28, 248, 249, 252, and 263 in FIGS. 8 and 9) and the positions of the vertices (e.g., vertices 12–14 and 250–261 in FIG. 9) of the tessellated triangle primitives (e.g., primitives 221–236 in FIG. 9). The operation codes issued by the normal state machine 1421 are directed primarily at computing the x, y, and z-components of normal control points (e.g., control points 12–14, 30–32, 265, and 266) and the normals of the vertices of the tessellated primitives. The operation codes issued by the attribute state machine 1422 are directed primarily at computing the remaining attributes (e.g., texture, fog, color, etc.) of the vertices of the tessellated primitives.

The operation codes issued by the lower-level state machines 1420–1422 are input to an arbiter 1427 for selection of a single operation code 1431 to be delivered to the arbitration module 1403. The HOS arbiter 1427 selects one of the operation codes issued by the lower-level state machines 1420–1422 for delivery to the arbitration module 1403 preferably based on a prestored prioritization scheme. In a preferred prioritization scheme, operation codes related to position computations (i.e., operation codes issued by the position state machine 1420) are given highest priority followed by operation codes related to vertex normal computations and attribute computations, respectively. In an alternative embodiment, the HOS arbiter 1427 may select one of the operation codes issued by the lower-level state machines 1420–1422 based on the status of a priority flag or other indication forming part of the operation code, or simply in a round robin manner. Therefore, in sum, the HOS thread controller 1401 issues operation codes 1431 for generating control points and the vertex parameters of the vertices of the tessellated primitives under the hierarchical control of the walking state machine 1419 and the lower-level state machines 1420–1422.

In the preferred embodiment, the arbitration module 1403 receives operation codes 1431, 1433 from the HOS thread controller 1401 and one or more other thread controllers (only the HOS thread controller 1401 is shown). Each of the non-HOS thread controllers (not shown) manages a corresponding thread for, inter alia, determining the vertices and associated attributes of primitives to be rendered, performing transform operations on the vertices, performing clipping operations on the primitives, determining lighting effects, and determining texture coordinate values. Each thread is a sequence of operation codes 1431, 1433 that are executed under the control of the corresponding thread controller. Each operation code 1431, 1433 includes a thread identifier that identifies the particular thread controller that issued the operation code 1431, 1433, a type of operation to be performed, one or more optional source addresses, and an optional destination address. When an operation code 1431, 1433 is provided to one of the computation engines 1405, 1406, the computation engine 1405, 1406 executes the operation using data stored in source addresses and stores the result in a destination address (e.g., in the HOS computation memory 1410, the swappable memory 1418, or an output data flow memory 1411, 1412 for subsequent transmission to the TCL input vertex memory 1413). The source addresses and destination address may be predetermined based on the particular operation of the particular thread being executed (e.g., the particular state of the walking state machine 1419). As such, memory contention is eliminated, and the need for a memory controller is also eliminated. The elimination of memory contention is discussed in greater detail with reference to FIG. 15 below.

The HOS thread controller 1401 and the other thread controllers preferably issue operation codes 1431, 1433 only when the operation codes 1431, 1433 can be executed by a computation engine 1405, 1406 without any potential for delay in waiting for the results of previously issued operation codes. For example, when an operation code is dependent on the results of a previously issued operation code, the thread controller 1401 will not release the dependent operation code until a certain amount of time has passed corresponding to the latency associated with executing the operation code that produces the data required by the dependent operation code. Preferably, each thread controller 1401 only issues one operation code at a time.

The arbitration module 1403 receives the operation codes 1431, 1433 from the thread controllers and, based on a prioritization scheme, orders the operation codes 1431, 1433 for execution by the computation engines 1405, 1406. In a preferred embodiment, two computation engines 1405, 1406 are utilized in the high-order primitive processing unit 460 to improve overall processing efficiency. Both computation engines 1405, 1406 preferably support multiple threads via the arbitration module 1403, as opposed to being dedicated to processing operation codes issued by a single thread controller. By supporting multiple threads, the computation engines 1405, 1406 are more likely to maintain balanced processing loads. For example, not all graphics scenes use high-order primitives 10 that require tessellation. Accordingly, a single computation engine 1405 dedicated to support the operation codes 1431 issued by the HOS thread controller 1401 would not optimally utilize the processing resources of the engine 1405 because not all graphics primitives may require high-order primitive processing. In an alternative embodiment, a single computation engine 1405 may be used provided that the processing speed of the engine 1405 is sufficient to execute operation codes without introducing noticeable delays in the processing of any one particular thread.

The arbitration module 1403 provides the operation codes to the computation engines 1405, 1406 in an ordered serial manner, such that loading of both engines 1405, 1406 is approximately equal. The ordered operation codes are preferably provided to each computation engine 1405, 1406 at the processing rate of the respective computation engine 1405, 1406, such that each computation engine 1405, 1406 is fully utilized (i.e., the pipeline included in the computation engine 1405, 1406 is kept full). The order in which the operation codes 1431, 1433 are provided to the computation engines 1405, 1406 follows a prioritization scheme that may be dependent upon the application being executed by the processor 410 and/or a prioritization flag or other indication issued by one or more of the thread controllers. For example, since the processing of graphics primitives is very structured, an application-specific prioritization scheme may prioritize operations in a back-to-front manner that ensures that processing that is nearing completion is prioritized over processing that is just beginning. Prioritizing the final steps to produce results passed to downstream circuitry may help to ensure that the resources in the pipeline of the computation engine 1405, 1406 are efficiently utilized and a regular production rate of results can be maintained. Alternatively, or in addition to an application-specific prioritization scheme, the HOS thread controller 1401 may include a priority indication (e.g., a single bit flag or a set of bits) in certain operation codes 1431 based on a quantity of vertices of tessellated primitives awaiting subsequent processing (e.g., transform, clipping, and lighting processing), thereby prioritizing high-order primitive processing particularly when transform, clipping, and lighting processing (TCL processing) is completing more rapidly than high-order primitive processing.

The computation engines 1405, 1406, which are discussed in greater detail below with respect to FIG. 15, receive the ordered operation codes from the arbitration module 1403 and execute the operations contained in the codes to generate computational resultants 1437–1441. The ordered operation codes are received by the computation engines 1405, 1406 in a synchronized manner corresponding to the respective operating rates of the engines 1405, 1406. The objective of the arbitration module 1403 is to order the operation codes 1431, 1433 such that each computation engine 1405, 1406 operates at capacity (i.e., the pipeline within each computation engine 1405, 1406 is always full and the resources in each computation engine 1405, 1406 are efficiently utilized). Thus, for every operation cycle of each computation engine 1405, 1406, the arbitration module 1403 attempts to provide each computation engine 1405, 1406 with an operation code for execution.

As stated above, each operation code 1431, 1433 typically includes at least one corresponding source address from which the computation engine 1405, 1406 is to retrieve data or other information (e.g., an operand) to be used in executing the operation code. The source address is an address of a memory or a lookup table coupled to the computation engine 1405, 1406. For example, as described in more detail below, the operation codes 1431 issued by the HOS thread controller 1401 typically include one or more source addresses associated with one or more of the vertex memory 1408, the HOS computation memory 1410, the swappable memory 1418 and the lookup tables 1415–1417. However, some operation codes may not include source addresses because such addresses may be hard-coded into an address generation unit (not shown) positioned between the arbitration module 1403 and the computation engines 1405, 1406 in accordance with a fixed tessellation rule set. The computation engines 1405, 1406 use the data retrieved from the source address or addresses to produce the computational resultants 1437–1441. The resultants 1437–1441 produced by each computation engine 1405, 1406 are stored in one of several memories 1410–1413, 1418 at locations that may be based on a destination address determined from attributes of the received operation codes (e.g., thread identity, operation performed, etc.). By providing a dedicated memory for each result produced by the computation engines 1405, 1406, memory contention is eliminated. Such segmentation of system memory is described in additional detail with respect to FIG. 15 below. As stated above, each operation code 1431, 1433 either includes the corresponding source and destination addresses required for execution or has such addresses hard-coded in accordance with a fixed rule set. The utilization of such predetermined memory locations eliminates the need for a memory controller that maintains the location of various pieces of data.

Exemplary operation of the preferred high-order processing unit 460 may be more clearly described with reference to the generation of the position control points 12–14, 22–28 and the normal control points 12–14, 30–32 depicted in FIG. 8, the determination of the position components of edge vertices 250–252 and 254 of tessellated primitives 229 and 234–236 depicted in FIG. 9, the determination of the normal components 272–274, 276 of edge vertices 250–252 and 254 depicted in FIG. 10, the generation of supplemental position and normal control points 248, 249, 252, 263, 265 and 266 depicted in FIG. 9, and the determination of the position component and the normal component 275 of vertex 253 lying on iso-parametric line 306 as depicted in FIGS. 9 and 10. During execution of an application requiring high-order graphics primitives 10 to be drawn, the processor 410 stores the vertex parameters for each high-order primitive 10 in the vertex memory 1408. In addition, the processor 410 stores the primitive list and preferably the tessellation level for each high-order primitive 10 in the primitive list buffer 1409. The tessellation level associated with generating the tessellated primitives 221–236 of FIG. 9 is three.

After all the vertex parameters for a particular high-order primitive 10 have been stored in the vertex memory 1408 as indicated by a validation bitmap stored in the primitive list buffer 1409, the walking state machine 1419 issues an operation code to the position and normal state machines 1420, 1421 (e.g., sets a flag to be read by the position and normal state machines 1420, 1421), wherein the operation code instructs the position and normal state machines 1420, 1421 to generate respective control points (e.g., control points 12–14 and 22–28 for position, and control points 12–14 and 30–32 for normal) and determine the position and normal components of the vertices 12–14, 250–261 of the tessellated primitives 221–236 for the high-order primitive 10. Unless otherwise indicated herein, the following description of the operation of the high-order processing unit 460 will be presented for a tessellation level of three, resulting in sixteen tessellated primitives 221–236 as illustrated in FIG. 9. One of ordinary skill in the art will recognize that the present invention may be utilized to tessellate high-order primitives in accordance with any desired tessellation level.

Responsive to receiving the startup operation code from the walking state machine 1419 (e.g., detecting that a particular walking state machine flag is set), the position and normal state machines 1420, 1421 proceed through a series of states in which the state machines 1420, 1421 issue respective series of operation codes to generate their respective control points 12–14, 22–28, 30–32. In addition, the walking state machine 1419 issues another operation code (e.g., sets another flag) instructing the lower-level state machines 1420–1422 to generate a first supplemental vertex (e.g., original vertex 13 in FIG. 9) and enter a wait mode. As used herein, the term "supplemental vertex" refers to a vertex 12–14, 250–261 of one of the tessellated primitives 221–236 and includes each original vertex 12–14 of the high-order primitive 10 because the original vertices 12–14 are also vertices of tessellated primitives 221, 230, and 236.

To compute their respective control points 12–14, 22–28, 30–32, the position and normal state machines 1420, 1421 issue operation codes instructing the computation engine 1405, 1406 selected by the arbitration module 1403 to compute the control points 12–14, 22–28, 30–32 in x, y, z-coordinates based on the position coordinates and normals 62–64 of the original vertices 12–14 of the high-order primitive 10 as described in detail above. The operation codes issued by the position and normal state machines 1420, 1421 also instruct the computation engines 1405, 1406 to store the newly generated control points 22–28, 30–32 in the HOS computation memory 1410 for use during generation of the position and normal components of the vertices 12–14, 250–261 of the tessellated primitives 221–236. Control points 12–14 are already preferably stored in the vertex memory 1408 since they are original vertices of the high-order primitive 10 and, therefore, are not re-stored in the HOS computation memory 1410 (although they could be), unless the position coordinates of the vertices 12–14 are scaled or homogenized by the "w" position coordinate in an x, y, z, w-coordinate system (as opposed to the "w" barycentric coordinate) in instances where the w-coordinate is not equal to one.

With respect to generating control points 22–28 and 30–32 in response to receiving corresponding operation codes from the position and normal state machines 1420, 1421, one or both of the computation engines 1405, 1406, at the direction of the arbitration module 1403, perform all (if only one engine is selected to compute the control points 22–28, 30–32) or some (if both engines 1405, 1406 are used) of the control point generation operations described above with respect to FIGS. 3–4 and 7 or FIGS. 5–7 depending on which approach is selected for computing control points 22–28. For example, to compute control point 22 as illustrated in FIG. 3, the selected computation engine 1405, 1406 first computes the projection of vertex 13 onto plane 503 by performing a vector dot product to determine reference point 522. In order to perform this computation, the selected computation engine 1405, 1406 retrieves the position and normal components of vertex 14 and the position components of vertex 13 from the vertex memory 1408. The computed result (reference point 522) is stored in the HOS computation memory 1410.

Next, the selected computation engine 1405, 1406 computes the reference sub-segment 523 by first using vector addition to compute the reference line segment between vertex 14 and reference point 522 and then using vector multiplication on the reference line segment to compute the fraction representing the reference sub-segment 523. To perform these computations, the selected computation engine 1405, 1406 retrieves the reference point computation results 1435 (reference point 522) from the HOS computation memory 1410 and the position components of vertex 14 from either the vertex memory 1408 (in most cases) or the HOS computation memory 1410 (only in certain cases when the reference point position is scaled or homogenized by the "w" position coordinate in an x, y, z, w-coordinate system (as opposed to the "W" barycentric coordinate) in instances where the w-coordinate is not equal to one). For example, if the position components of the reference point 522 need to be homogenized the w-coordinate before control point generation (e.g., if (x, y, z, w) must be represented as (x/w, y/w, z/w, 1) because the w-coordinate is not equal to one), the new homogenized position coordinates (x/w, y/w, z/w, 1) are stored in the HOS computation memory 1410 and used for control point generation. The reference sub-segment computation results are also stored in HOS computation memory 1410.

Lastly, the selected computation engine 1405, 1406 computes the position of control point 22 as the end of the reference sub-segment 523 using vector addition. To perform this last computation, the selected computation engine 1405, 1406 retrieves the reference sub-segment computation 1435 from HOS computation memory 1410 and the position components of vertex 14 from the vertex memory 1408 or the HOS computation memory 1410 (when the vertex position components are homogenized). The remaining position control points 23–28 are determined through similar data retrieval, vector computation, and resultant storage in accordance with operation codes issued by the position state machine 1420 implementing the methodologies described above with respect to FIGS. 3–7.

The normal control points 30–32 are computed by the computation engines 1405, 1406 in a similar manner in response to operation codes issued by the normal state machine 1421. The operation codes provide step-by-step instructions for evaluating the control point equations for $CP_{30}$—$CP_{32}$ set forth above with respect to FIG. 8. The normal control points 30–32 and any intermediate resultants derived in computing the control points 30–32 are stored in the HOS computation memory 1410, with the intermediate resultants being deleted once their use is no longer necessary.

After the position and normal state machines 1420, 1421 have computed their respective control points 12–14, 22–28, 30–32, the state machines 1420, 1421 read the walking state machine flag and thereby receive an operation code from the walking state machine 1419 instructing them to begin generating the first supplemental vertex (e.g., vertex 13 in FIG. 9). After each lower-level state machine 1420–1422 completes its processing with respect to the first supplemental vertex (i.e., respectively generating the position, normal, and other attributes of the first supplemental vertex), the particular state machine 1420–1422 sets a flag indicating completion of its respective processing. The walking state machine 1419 periodically (e.g., once a clock cycle) checks the status of the lower-level state machine completion flags. Once the walking state machine 1419 detects that the completion flag for each lower-level state machine 1420–1422 is set indicating completion of generation of the first supplemental vertex, the walking state machine 1419 sets its vertex generation flag again (which had been reset once vertex processing began on the first supplemental vertex) instructing the lower-level state machines 1420–1422 to begin generating the next supplemental vertex (e.g., vertex 250 in FIG. 9). This sequence continues until all the supplemental vertices for a particular level of tessellation have been generated. More details with respect to the computation of individual supplemental vertices 12–14, 250–261 is provided below.

In addition, as discussed above, the processing completion flag of one lower-level state machine 142–1422 may be used by another lower-level state machine 1420–1422 as a trigger to begin issuing operation codes. For example, the normal state machine 1421 preferably waits until it receives a flag from the position state machine 1420 indicating the generation of certain position control points 22–28 before issuing commands or operation codes to generate normal control points 30–32 because computation of the normal control points 30–32 preferably reuses many of the computations carried out to generate the position control points 22–28.

When the arbitration module 1403 selects a HOS operation code 1431 for processing, the arbitration module 1403 provides the code to one or both of the computation engines 1405, 1406 depending on the type of instruction represented by the code 1431. In the preferred embodiment, the use of two computation engines 1405, 1406 enables the position, normal and/or attribute components of the new vertices 250–261 of the tessellated primitives 221–236 to be computed in fewer processing cycles (e.g., two processing cycles for position components x, y, z, and w, as opposed to four cycles with a single computation engine). In the preferred embodiment, the lower-level state machines 1420–1422 of the HOS thread controller 1401 issue both single instruction operation codes and double instruction operation codes. The single instruction code instructs the arbitration module 1403 to assign the code to one of the computation engines 1405, 1406 for execution. The double instruction codes instruct the arbitration module 1403 to assign one instruction code to one computation engine 1405 and another instruction code to the other computation engine 1406 for execution preferably during the same processing cycle. For example, to compute the position coordinates (x, y, z, w) for each of the new vertices 250–261 of the tessellated primitives 221–236, the position state machine 1420 preferably issues a double instruction operation code, such that one computation engine 1405 computes the x-coordinate in one processing cycle and the z-coordinate in the next processing cycle, and the other computation engine 1406 computes the y-coordinate in the same processing cycle in which the x-coordinate is computed and computes the w-coordinate in the same processing cycle in which the z-coordinate is computed. In this manner, the position coordinates of each new vertex 250–261 are computed in two processing cycles, as opposed to four cycles with a single computation engine. Similarly, the normal state machine 1421 and/or the attribute state machine 1422 may issue single or double instruction codes to reduce the processing time associated with computing vertex normals and attributes.

As discussed above, the swappable memory 1418 is used to store control point data on an as-needed basis for use in computing the positions, normals, and attributes for the supplemental vertices 12–14, 250–261 of the tessellated primitives 221–236. The swappable memory 1418 is preferably double-buffered. Thus, when a computation engine 1405 reads from one area of the swappable memory 1418 (e.g., the position area 1448), the computation engine 1405 or another computation engine 1406 may write to the same area 1448 (in another section) or another area 1449, 1450 of swappable memory 1418 in the same clock cycle. For example, after position control points 22–28 of FIG. 8 are computed and stored in the HOS computation memory 1410, the computation engines 1405, 1406, responsive to operation codes issued by the position state machine 1420, copy or write control points to be used in a particular position computation (e.g., control points 12, 13, 25 and 26 where original vertices 12 and 13 are being used as control points and the position of a vertex along edge 20 is to be computed) into registers in the position area 1448 of the swappable memory 1418. As discussed above, the areas 1448–1450 of swappable memory 1418 are implemented such that data may be written into each area's memory registers in rows, but be read from the registers in columns. After the particular control points have been read into the position area 1448 of the swappable memory 1418, the computation engines 1405, 1406 read the stored data as column vectors from the position area 1448 and perform a vector dot product operation with a selected entry of one of the lookup tables 1415–1417 to compute a position component of a new supplemental vertex 250–261 or a supplemental control point 248, 249, 263. For instance, as described in more detail below, the x-component of supplemental vertex 250 is derived by reading the x-components of vertex 12, control point 25, control point 26, and vertex 13 (i.e., a column vector) from the position area 1448 of the swappable memory 1418 and performing a dot product between the read x-components and weighting factors stored in the edge lookup table 1415, wherein the weighting factors are associated with control points 12, 25, 26, 13 that have an index in which the j-component of the control point variable $P_{ijk}$ (e.g., $P_{300}$, $P_{201}$, $P_{102}$, $P_{003}$) in the cubic Bezier triangle equation equals zero.

As illustrated in FIG. 9 and discussed in detail above, the vertices of the tessellated primitives 221–236 include the three original vertices 12–14 of the high-order primitive 10. These three vertices 12–14 also serve as control points for generating the supplemental vertex positions and normals.

To compute the positions of the supplemental vertices 12–14, 250–261, the walking state machine 1419 sets a flag instructing the lower level state machines 1420–1421 to process the first supplemental vertex. The first supplemental vertex is preferably one of the original vertices 12–14. For purposes of this discussion, the first supplemental vertex is original vertex 13.

Responsive to detecting the walking state machine's set flag, the lower level state machines 1420–1422 issue respective series of operation codes instructing the computation engine 1405, 1406 to copy the corresponding vertex parameter (position, normal, or attribute) for vertex 13 from the vertex memory 1408 (source address) to the TCL input vertex memory 1413 (destination address). In addition, the position and normal state machines 1420, 1421 instruct the computation engine 1405, 1406 to copy the position and normal control points associated with one of the edges 18, 20 intersecting vertex 13 from the HOS computation memory 1410 (source addresses) to their respective areas 1448, 1449 of the swappable memory 1418 (destination addresses). That is, the position state machine 1420 issues an operation code (e.g., "COPY UPPER" or "COPY LOWER") instructing the computation engine 1405, 1406 to copy the position control points associated with either edge 20 (control points 12, 13, 25 and 26) or edge 18 (control points 13, 14, 22 and 27)—depending on the direction that the walking state machine 1419 desires to traverse the isoparametric lines 302–310—to one section of the position area 1448 of swappable memory 1418. Likewise, the normal state machine 1421 issues an operation code (e.g., "COPY UPPER" or "COPY LOWER") instructing the computation engine 1405, 1406 to copy the normal control points associated with either edge 20 (control points 12, 13, and 30) or edge 18 (control points 13, 14 and 31) to one section of the normal area 1449 of swappable memory 1418. For the purposes of the following discussion, the position and normal state machines 1420, 1421 will be assumed to have issued operation codes ("COPY UPPER") instructing the computation engine 1405, 1406 to copy the position and normal control points associated with edge 20 to one section of their respective areas 1448, 1449 of swappable memory 1418.

The "COPY" codes are passed to the HOS arbiter 1427 by the lower-level state machines 1420–1422. The HOS arbiter 1427 provides one code 1431 to the arbitration module 1403, which in turn provides the code 1431 to a computation engine 1405, 1406. The arbitration process continues until the "COPY" code 1431 from each lower-level state machine 1420–1422 has been executed by a computation engine 1405, 1406. Each code 1431 may be provided to the same computation engine 1405, 1406 or the codes 1431 may be divided among the engines 1405, 1406 based on the loading of the engines 1405, 1406 under the control of the arbitration module 1403.

Once a computation engine 1405, 1406 receives a "COPY" code 1431, the computation engine 1405, 1406 accesses the vertex memory 1408 or the HOS computation memory 1410, depending on which "COPY" code is being processed, and retrieves the vertex parameters (e.g., position, normal or attribute components) or certain control points (e.g., for a "COPY UPPER" or "COPY LOWER" code) associated with the vertex 13 referenced in the operation code 1431. However, one of ordinary skill in the art will appreciate that a fixed tessellation rule set may be hard-coded into an address decoder (not shown) to fix the source and destination addresses of "COPY UPPER" or "COPY LOWER" codes based on a single or multi-bit flag, instead of including such addresses (e.g., HOS computation memory 1410 and swappable memory 1418) in the codes themselves.

The computation engine 1405, 1406 stores the copied vertex parameters of vertex 13 in a respective output data flow memory 1411, 1412. The vertex parameters are stored in the output data flow memory 1411, 1412 so that they may be properly sequenced, if necessary, for storage in the TCL input vertex memory 1413. In the case of the "COPY" operation, sequencing is less of an issue and the computation engine 1405, 1406 simply stores the copied vertex parameters directly into the address of the TCL input vertex memory 1413 identified in the "COPY" operation code received from the arbitration module 1403. The computation engine 1405, 1406 stores the copied control points in the appropriate areas 1448, 1449 of the swappable memory 1418.

After the "COPY" code or codes from each lower-level state machine 1420–1422 has been processed as indicated by flags set by each lower-level state machine 1420–1422, the walking state machine 1419 sets a flag or issues an operation code instructing the lower-level state machines 1420–1422 to determine the components of the next supplemental vertex. The next supplemental vertex is a vertex residing on one of the edges 18, 20 that intersect the first supplemental vertex 13. For the purposes of this discussion, it is presumed that generation of new vertices 250–261 will occur along iso-parametric lines 302–310 in the direction from edge 20 to edge 18 (i.e., along lines 302–310 in which the "w" barycentric coordinate is constant). Therefore, the next vertex to be computed is vertex 250 of tessellated primitive 236. However, one of ordinary skill in the art will appreciate that the vertices 250–261 may alternatively be generated along iso-parametric lines in which either the "u" or the "v" barycentric coordinate is constant, thereby resulting in a different order for determining components of the new vertices 250–261. The operation code issued by the walking state machine 1419 may also provide a destination address for the parameters of the vertex 250. The destination address of all vertex parameters is preferably the TCL input vertex memory 1413. As noted above, the computation engines 1405, 1406 preferably store output data in respective output data flow memories 1411, 1412 for synchronization purposes prior to providing the data to the TCL input vertex memory 1413.

Responsive to the flag or operation code issued by the walking state machine 1419 instructing generation of vertex components for supplemental vertex 250, the lower-level state machines 1420–1422 begin issuing a series of operation codes to instruct the computation engines 1405, 1406 to compute the position, normal and attribute components of vertex 250. To compute the position components of vertex 250, the position state machine 1420 issues a first double instruction operation code (e.g., "COMPUTE X, Y") instructing one computation engine 1405 to compute the x-component of the vertex position and the other computation engine 1406 to compute the y-component of the vertex position during the same clock cycle. The double instruction code preferably includes the destination address (e.g., TCL input vertex memory 1413) received from the walking state machine 1419 and may include the source address (e.g., one section of the position area 1448 of the swappable memory 1418). Alternatively, the source address may be hard-coded into an address decoder in accordance with a fixed tessellation rule set.

Responsive to receiving the "COMPUTE X, Y" code, the computation engines 1405, 1406 retrieve the x and y-components of the control points 12, 13, 25, 26 from the position area 1448 of swappable memory 1418, retrieve appropriate weighting factors from the edge lookup table 1415 and perform a vector dot product between the retrieved control point components and the weighting factors to compute the x and y-components of the position of vertex 250. As discussed above, the retrieval of control point components from the position area 1448 of swappable memory 1418 is performed on a column-by-column basis. Accordingly, the column containing the x-components of the control points 12, 13, 25, 26 is used to compute the x-component of vertex 250 and the column containing the y-components of the control points 12, 13, 25, 26 is used to compute the y-component of vertex 250. The edge table 1415 contains pre-stored weighting factors that provide a cubic relation between the control points that relate to a particular edge 18–20 and the position coordinates of the supplemental vertices located along that edge 18–20. The control points that relate to a particular edge 18–20 are the control points that were determined based on the positions and normals of the two vertices that define the edge 18–20. For example, control points 12, 13, 25, 26 relate to edge 20, control points 12, 14, 23, and 24 relate to edge 19, and control points 13, 14, 22, and 27 relate to edge 18.

As stated above, the Bernstein polynomial for position provides that if given the control points $P_{ijk}$, such that the sum of i, j, and k equals 3 (i+j+k=3) and the product of i, j, and k is greater than or equal to zero (ijk$\geq$0), a cubic Bezier triangle is defined as $$B(u, v, w) = \sum P_{ijk} \frac{6}{i!j!k!} u^i v^j w^k,$$

where u+v+w=1, i+j+k=3, and $P_{ijk}$ are vectors corresponding to control points 12–14 and 22–28. The Bernstein polynomial can be rewritten in long form as:

$$B(u,v,w)=P_{300}\cdot u^3+P_{030}\cdot v^3+P_{003}\cdot w^3+P_{120}\cdot 3uv^2+P_{102}\cdot 3uw^2+P_{012}\cdot 3vw^2+P_{021}\cdot 3v^2w+P_{201}\cdot 3u^2w+P_{210}\cdot 3u^2v+P_{111}\cdot 6uvw$$

where $P_{300}$ corresponds to vertex 12, $P_{030}$ corresponds to vertex 14, $P_{003}$ corresponds to vertex 13, $P_{120}$ corresponds to control point 23, $P_{102}$ corresponds to control point 26, $P_{012}$ corresponds to control point 27, $P_{021}$ corresponds to control point 22, $P_{201}$ corresponds to control point 25, $P_{210}$ corresponds to control point 24, and $P_{111}$ corresponds to control point 28.

Along edge 19, w=0 and v=1−u, thus the Bernstein polynomial reduces to:

$$B(u) = P_{300} \cdot u^3 + P_{030} \cdot v^3 + P_{120} \cdot 3uv^2 + P_{210} \cdot 3u^2v$$
$$= P_{030} \cdot (1-u)^3 + P_{120} \cdot 3(1-u)^2 u + P_{210} \cdot 3(1-u)^2 u + P_{300} \cdot u^3$$
$$= P_{030} \cdot C_0 + P_{120} \cdot C_1 P_{210} \cdot C_2 + P_{300} \cdot C_3,$$

where $C_0 = (1-u)^3$, $C_1 = 3(1-u)^2 u$, $C_2 = 3(1-u)u^2$, and $C_3 = u^3$.

Similarly, along edge 20, v=0 and w=1−u, thus the Bernstein polynomial reduces to:

$$B(u) = P_{300} \cdot u^3 + P_{003} \cdot (1-u)^3 + P_{102} \cdot 3u(1-u)^2 + P_{201} \cdot 3u^2(1-u)$$
$$= P_{003} \cdot C_0 + P_{102} \cdot C_1 + P_{201} \cdot C_2 + P_{300} \cdot C_3 u^3,$$

where $C_0 = (1-u)^3$, $C_1 = 3(1-u)^2 u$, $C_2 = 3(1-u)u^2$, and $C_3 = u^3$.

Finally, along edge 18, u=0 and w=1−v, thus the Bernstein polynomial reduces to:

$$B(v) = P_{030} \cdot v^3 + P_{003} \cdot (1-v)^3 + P_{012} \cdot 3v(1-v)^2 + P_{021} \cdot 3v^2(1-v)$$
$$= P_{003} \cdot C_0 + P_{102} \cdot C_1 + P_{021} \cdot C_2 + P_{030} \cdot C_3,$$

where $C_0 = (1-v)^3$, $C_1 = 3(1-v)^2 v$, $C_2 = 3(1-v)v^2$, and $C_3 = v^3$.

For a given tessellation level, the values of the barycentric coordinates (u, v, w) for the new vertices of the tessellated primitives 221–236 are within a known set of values. For example, for a tessellation level of three, "u," "v," and "w" can be any value from the set 0, 0.25, 0.5, 0.75, and 1. When the values of "u," "v," and "w" are 1,0,0; 0,0,1; and 0,1,0, respectively, the new vertices correspond to the original vertices 12–14 of the high-order primitive 10. Therefore, for a tessellation level of three, three additional vertices must be generated along each edge 18–20 corresponding to the three remaining values of each barycentric coordinate which is not zero or one along the particular edge 18–20. The edge table 1415 contains the pre-stored weighting factors (e.g., $C_0$–$C_3$) for the various possible known values of one of the barycentric coordinates for various possible tessellation levels. For example, for a tessellation level of three, the edge table 1415 preferably includes the values of $(1-u)^3$, $3(1-u)^2 u$, $3(1-u)u^2$, and $u^3$ for u=0.25, 0.50, and 0.75.

The size of the edge table 1415 may be minimized by recognizing that the values of $(1-u)^3$, $3(1-u)^2 u$, $3(1-u)u^2$, and $u^3$ for u=0.75 is the reciprocal of the values of $(1-u)^3$, $3(1-u)^2 u$, $3(1-u)u^2$, and $u^3$ for u=0.25. That is, the values of $(1-u)^3$, $3(1-u)^2 u$, $3(1-u)u^2$, and $u^3$ for u=0.75 are the same as the values of $u^3$, $3(1-u)u^2$, $3(1-u)^2 u$, and $(1-u)^3$ for u=0.25. Thus, when the values of $(1-u)^3$, $3(1-u)^2 u$, $3(1-u)u^2$, and $u^3$ for u=0.75 are desired, the values of $(1-u)^3$, $3(1-u)^2 u$, $3(1-u)u^2$, and $u^3$ for u=0.25 may be read from the edge table 1415 in reverse order to obtain the desired values of $(1-u)^3$, $3(1-u)^2 u$, $3(1-u)u^2$, and $u^3$ for u=0.75. Similar table size reduction benefits may be obtained for all tessellation values in which one or more values of "u" (or another barycentric coordinate) equal one minus other values of "u".

The edge table 1415 also contains similar weighting factors for use in determining the normal components (e.g., normals 272–274, 276) of the edge vertices (e.g., vertices 250–252, 254). The normal weighting factors are derived by expanding the Bernstein polynomial defining a quadratic Bezier triangle as follows:

$$B(u, v, w) = \sum N_{ijk} \frac{2}{i!j!k!} u^i v^j w^k,$$

where u+v+w=1, i+j+k=2, and $N_{ijk}$ are vectors corresponding to control points 12–14 and 30–32. The Bernstein polynomial can be rewritten in long form as:

$$B(u,v,w) = N_{200} \cdot u^2 + N_{020} \cdot V^2 + N_{002} \cdot w^2 + N_{110} \cdot 2uv + N_{011} 2uw + N_{011} \cdot vw$$

where $N_{200}$ corresponds to vertex 12, $N_{020}$ corresponds to vertex 14, $N_{002}$ corresponds to vertex 13, $N_{110}$ corresponds to control point 32, $N_{101}$ corresponds to control point 30, and $N_{011}$ corresponds to control point 31.

Along edge 19, w=0 and v=1−u, thus the Bernstein polynomial reduces to:

$$B(u) = N_{200} \cdot u^2 + N_{020} \cdot v^3 + N_{110} \cdot 2uv$$
$$= N_{020} \cdot (1-u)^2 + N_{110} \cdot 2(1-u)u + N_{200} \cdot u^2$$
$$= N_{020} \cdot C'_0 + N_{110} \cdot C'_1 + N_{200} \cdot C'_2,$$

where $C'_0 = (1-u)^2$, $C'_1 = 2(1-u)u$, and $C'_2 = u^2$.

Similarly, along edge 20, v−0 and w=1−u, thus the Bernstein polynomial reduces to:

$$B(u) = N_{002} \cdot (1-u)^2 + N_{101} \cdot 2(1-u)u + N_{200} \cdot u^2$$
$$= N_{002} \cdot C'_0 + N_{101} \cdot C'_1 + N_{200} \cdot C'_2,$$

where $C'_0 = (1-u)^2$, $C'_1 = 2(1-u)u$, and $C'_2 = u^2$.

Finally, along edge 18, u=0 and w=1−v, thus the Bernstein polynomial reduces to:

$$B(v) = N_{002} \cdot (1-v)^2 + N_{011} \cdot 2(1-v)v + N_{020} \cdot v^2$$
$$= N_{002} \cdot C'_0 + N_{011} \cdot C'_1 + N_{020} \cdot C'_2,$$

where $C'_0 = (1-v)^2$, $C'_1 = 2(1-v)v$, and $C'_2 = v^2$.

Therefore, the edge table 1415 also contains pre-stored weighting factors (e.g., $C'_0$–$C'_2$) for the various possible values of one of the barycentric coordinates for various possible tessellation levels to facilitate determination of the normal components of the new vertices along each edge 18–20 of the high-order primitive 10. For example, for a tessellation level of three, the edge table 1415 preferably includes the values of $(1-u)^2$, $2(1-u)u$, and $u^2$ for u=0.25, 0.50, and 0.75. The size of the portion of the edge table 1415 used to store the normal weighting factors may also be reduced as discussed above with respect to the position weighting factors by noting that some of the values of "u" (or another barycentric coordinate) are equal to one minus other values of "u". In other words, some values of "u" are complements of other values of "u". Thus one set of normal weighting factors may be stored for two values of "u". In such a case, the stored weighting factors are read from the table 1415 in one direction for one value of "u" and are read from the table 1415 in the opposite direction for the complement value of "u".

After the position state machine 1420 has been notified by the arbitration module 1403 that the first double instruction operation code has been executed, the position state machine 1420 issues a second double instruction operation code (e.g., "COMPUTE Z, W") instructing one computation engine 1405 to compute the z-component of the vertex position and the other computation engine 1406 to compute the w-component of the vertex position during the same clock cycle. As each of the position coordinates of vertex 250 is determined, the result is stored in the output data flow memory 1411, 1412 and then the TCL input vertex memory 1413. For example, during one cycle of the computation engines 1405, 1406, the "x" and "y" coordinates are computed. During the next processing cycle, the "x" and "y" coordinates are stored in the output data flow memories 1411, 1412 and the "z" and "w" coordinates are computed. During the next two subsequent cycles, all four coordinates are stored as position components of the new vertex 250 in the TCL input vertex memory 1413.

During the same two clock cycles that the position components of vertex 250 are being computed by the computation engines 1405, 1406, the position state machine 1420 also instructs the computation engines 1405, 1406 (e.g., by issuing a "COPY LOWER" operation code) to copy the control points 13, 14, 22, 27 associated with edge 18 into the second section of the position area 1448 of swappable memory 1418 to facilitate computation of the position components of vertex 251, the next vertex to be computed because it lies on the same iso-parametric line 308 as does vertex 250. For example, during the first clock cycle (i.e., the clock cycle in which the "x" and "y" coordinates of vertex 250 are being computed), each computation engine 1405, 1406 preferably copies one control point (e.g., control point 14 and control point 22) relating to edge 18 into the second section of the position area 1448 of swappable memory 1418. For instance, computation engine 1405 preferably copies one control point (e.g., control point 14) into the second section of the position area 1448 of swappable memory 1418 during the same clock cycle that it computes the "x" coordinate of vertex 250. Similarly, computation engine 1406 preferably copies a different control point (e.g., control point 22) into the second section of the position area 1448 of the swappable memory 1418 during the same clock cycle that it computes the "y" coordinate of vertex 250.

During the second clock cycle (i.e., the clock cycle in which the "z" and "w" coordinates of vertex 250 are being computed), each computation engine 1405, 1406 preferably copies one of the remaining control points (e.g., control point 27 and control point 13) relating to edge 18 into the second section of the position area 1448 of swappable memory 1418. For instance, computation engine 1405 preferably copies one remaining control point (e.g., control point 27) into the second section of the position area 1448 of swappable memory 1418 during the same clock cycle that it computes the "z" coordinate of vertex 250. Similarly, computation engine 1406 preferably copies the other remaining control point (e.g., control point 14) into the second section of the position area 1448 of swappable memory 1418 during the same clock cycle that it computes the "w" coordinate of vertex 250.

While the position state machine 1420 is issuing operation codes to instruct the computation engines 1405, 1406 to compute the position components of vertex 250, the normal and attribute state machines 1421, 1422 are also issuing operation codes to instruct the computation engines 1421, 1422 to compute the normal and attribute components of vertex 250. The HOS arbiter 1427 receives the operation codes from the position, normal, and attribute state machines 1420–1422 and selects one operation code 1431 to provide to the arbitration module 1403 based on a stored prioritization scheme. For example, the HOS arbiter 1403 may utilize a back-to-front prioritization scheme as discussed above with respect to the arbitration module 1403 to ensure that processing that is nearing completion is prioritized over processing that is just beginning or may prioritize position operation codes for processing ahead of normal or attribute operation codes.

The arbitration module 1403 receives the selected operation code 1431 from the HOS arbiter 1427 and selects either the HOS operation code 1431 or an operation code 1433 from another thread to provide to one of the computation engines 1405, 1406. As discussed above, the arbitration module's operation code selection is preferably based on a prioritization scheme, such as the aforementioned passive back-to-front prioritization scheme and/or an active prioritization scheme in which a thread controller sets a priority bit indicating a priority status of the operation code issued by the controller. For example, the walking state machine 1419 preferably monitors the contents of the TCL input vertex memory 1413 by examining the contents of a status register 1429 that contains a bitmap indicating a quantity of the vertices currently stored in the TCL input vertex memory 1413. When the status register indicates that the TCL input vertex memory 1413 is not full or that a quantity of vertices stored in the TCL input vertex memory 1413 is less than an implementation-specific threshold (e.g., less than ninety percent of the maximum number of vertices that can be stored in the TCL input vertex memory 1413), the walking state machine 1419 sets a priority bit associated with the issued operation code to indicate that the operation code 1431, once output by the HOS arbiter 1427, has priority over operation codes 1433 issued by other thread controllers. Thus, the HOS thread controller 1401 actively asserts priority in an attempt to keep the TCL input vertex memory 1413 full and, thereby, reduce the likelihood that TCL processing may have to wait for new vertices from the HOS thread controller 1401 because TCL processing was allowed to complete before a sufficient number of new vertices were provided.

In a manner similar to the computation of the position components of vertex 250, the normal components of vertex 250 are computed by the computation engines 1405, 1406 under the control of the normal state machine 1421. In the preferred embodiment, the normal state machine 1421 issues a double instruction operation code during a first clock cycle followed by a single instruction code during the next clock cycle to instruct the computation engines 1405, 1406 to compute the x, y, and z components of the normal vector 272. To compute the x and y-components of normal 272, the normal state machine 1421 issues a double instruction operation code (e.g., "COMPUTE X, Y") instructing one computation engine 1405 to compute the x-component of the normal 272 and the other computation engine 1406 to compute the y-component of the normal 272 during the same clock cycle. The double instruction code preferably includes the destination address (e.g., TCL input vertex memory 1413) received from the walking state machine 1419 and may include the source address (e.g., one section of the normal area 1449 of the swappable memory 1418). Alternatively, the source address may be hard-coded into an address decoder in accordance with a fixed tessellation rule set.

Responsive to receiving the "COMPUTE X, Y" code from the normal state machine 1421, the computation engines 1405, 1406 retrieve the x and y-components of the normal control points 12, 13, 30 from the normal area 1449 of swappable memory 1418 (which normal control points 12, 13, 30 were stored in the normal area 1449 of the swappable memory 1418 during the clock cycle or cycles in which the vertex components for vertex 13 were copied from vertex memory 1408 into the output data flow memory 1411, 1412 or the TCL input vertex memory 1413), retrieve appropriate weighting factors ($C'_0$–$C'_2$) from the edge lookup table 1415, and perform a vector dot product between the retrieved control point components and the weighting factors to compute the x and y-components of normal 272. As discussed above, the retrieval of control point components from the normal area 1449 of swappable memory 1418 is performed on a column-by-column basis. Accordingly, the column containing the x-components of the control points 12, 13, 30 is used to compute the x-component of normal 272 and the column containing the y-components of the control points 12, 13, 30 is used to compute the y-component of normal 272.

During a subsequent (but not necessarily the next in time) clock cycle as assigned by the combination of the HOS arbiter 1427 and the arbitration module 1403, the computation engine 1405, 1406 selected by the arbitration module 1403 computes the z-component of normal 272 by retrieving the z-components of the normal control points 12, 13, 30 from the normal area 1449 of swappable memory 1418, retrieving the appropriate weighting factors ($C'_0$–$C'_2$) from the edge lookup table 1415, and performing a vector dot product between the retrieved control point components and the weighting factors to compute the z-component of normal 272.

During the same two clock cycles that the components of normal 272 are being computed by the computation engines 1405, 1406, the normal state machine 1421 also instructs the computation engines 1405, 1406 (e.g., by issuing a "COPY LOWER" operation code) to copy the normal control points 13, 14, 31 associated with edge 18 into the second section of the normal area 1449 of swappable memory 1418 to facilitate computation of the normal components of normal 273, the next normal to be computed because it relates to vertex 251, which lies on the same iso-parametric line 308 as does vertex 250.

Although the above discussion has suggested that the positions of original vertices 12–14 are stored in the position and normal areas 1448, 1449 of the swappable memory 1418 when one or more of such vertices 12–14 form control points for computing a particular new vertex 250–261, one of ordinary skill in the art will appreciate that such vertices 12–14 are already stored in vertex memory 1408 and, therefore, need not be restored in the swappable memory areas 1448, 1449. Rather, the respective addresses of the components of the original vertices 12–14 that are necessary for a particular new vertex computation may be included as source addresses for any operation codes that require use of such original vertex information.

During the time period that the position and normal state machines 1420, 1421 are issuing operation codes for computing the position and normal components of vertex 250, attribute state machine 1422 is also issuing operation codes to compute any other attributes (e.g., texture coordinates, fog data, color data, and/or blend weights) of the vertex 250. In a preferred embodiment, these additional attributes are linearly interpolated based on corresponding attributes of the original vertices 12–14 of the high-order primitive 10. Consequently, each additional attribute of vertex 250 is derived as a selected linear combination of the corresponding attributes of vertices 12–14. Therefore, the attribute state machine 1422 issues operation codes (e.g., COMPUTE codes) instructing the selected computation engine 1405, 1406 to perform a set of vector dot products between the components of the attributes and predetermined weighting factors to derive each attribute. The weighting factors to be applied to the applicable attributes of the original vertices 12–14 may be stored in another database or lookup table (not shown) of the high-order primitive processing unit 460. Similar to the position and normal areas 1448, 1449 of swappable memory 1418, the attribute area 1450 of swappable memory 1418 is also preferably double-buffered. Accordingly, while one attribute of vertex 250 (or any other new vertex 250–261) is being computed by applying linear barycentric interpolation to corresponding attributes of the original vertices 12–14, another attribute of each original vertex 12–14 is preferably stored in the attribute area 1450 of swappable memory 1418 for use in computing the next attribute of the new vertex 250. The completed attributes are stored in the TCL input vertex memory 1413. Similar to the computations required for determining the position and normal components of vertex 250, all intermediate computation results involved in determining the other attributes of vertex 250 are stored temporarily in the HOS computation memory 1410.

Once the computation engines 1405, 1406 have computed the position, normal and attribute components for vertex 250, they begin issuing instructions (e.g., "COMPUTE LOWER" instructions) to compute the respective components of vertex 251 in a manner similar to the above-described computations for vertex 250, except that newly loaded position control points 13, 14, 22, 27 and normal control points 13, 14, 31 are used for the computations of the position components and normal components, respectively, of vertex 251. During the same clock cycles in which the position and normal components of vertex 251 are being computed, the position control points 12, 13, 25, 26 and the normal control points 12, 13, 30 associated with edge 20 are stored in respective sections of the position and normal areas 1448, 1449 of swappable memory 1418 to facilitate the determination of the position and normal components, respectively, of vertex 252. That is, in addition to issuing "COMPUTE" operation codes to determine the position and normal components of vertex 251, the position and normal state machines 1420, 1421 also issue "COPY" operation codes ("COPY UPPER" in this case) to copy the respective position and normal control points from HOS computation memory 1410 into the appropriate areas 1448, 1449 of swappable memory 1418. As discussed above, each area 1448–1450 of the swappable memory 1418 is preferably double-buffered to enable the computation engines 1405, 1406 to read control points (e.g., control points 13, 14, 22, 27 and 31) necessary to compute the components of one vertex (e.g., vertex 251) from one section of each area 1448–1450 at the same time that the computation engines 1405, 1406 are storing control points (e.g., control points 12, 13, 25, 26 and 30) necessary to compute the components of another vertex (e.g., vertex 252) in another section of each area 1448–1450.

Although the position and normal control points related to the upper edge 20 of the high-order primitive 10 are, in accordance with a preferred embodiment of the present invention, generally loaded or copied into respective areas 1448, 1449 of swappable memory 1418 during the clock cycle or cycles in which parameters for a vertex located along the lower edge 18 of the high-order primitive 10 are being computed, one of ordinary skill in the art will recognize that such re-loading or re-copying of control points need not occur during the computation of vertex parameters for vertex 251. That is, since the vertex 250 computed just before vertex 251 also lies along the upper edge 20, the position and normal control points 12, 13, 25, 26, 30 for the upper edge 20 are already stored in one section of the position and normal areas 1448, 1449 of swappable memory 1418. Therefore, processing resources need not be used to re-copy those same control points 12, 13, 25, 26, 30 into the same sections of the position and normal areas 1448, 1449 of swappable memory 1418. Rather, the control points 12, 13, 25, 26, 30 may just be read from the position and normal areas 1448, 1449 as necessary to compute the position and normal components of the upper edge vertex 252.

Once the components of vertex 251 have been computed, the walking state machine 1419 determines that a tessellated primitive 236 has been completed and issues operation codes that instruct the TCL input vertex memory 1413, via the HOS arbiter 1427, the arbitration module 1403, and a selected computation engine 1405, 1406, to output the vertices 13, 250, 251 for the completed primitive 236 to the next processing stage (e.g., transformation, clipping, lighting, etc.) and to delete the vertex information for vertex 13. However, the vertex information for vertices 251 and 252 remains in TCL input vertex memory 1413 because such vertices 251, 252 help define other uncompleted tessellated primitives 229, 234, 235. Thus, in accordance with the present invention, computed vertices remain stored in TCL input vertex memory 1413 until they are no longer needed to form a tessellated primitive. Consequently, vertex components are computed only once for each new vertex 250–261 and are used (and reused) to define respective tessellated primitives. By computing vertex components for each new vertex 250–261 only once, substantial processing savings result as compared to repeatedly computing vertex information for each vertex of each tessellated primitive. Since the new vertices 250–261 are computed along iso-parametric lines 302–310, vertex information for each new vertex 250–261 can be stored for a sufficient period of time in TCL input vertex memory 1413 to enable completion of the tessellated primitives defined by each vertex without completely filling or overflowing the TCL input vertex memory 1413 (which, in a preferred embodiment, can store information for up to ten vertices).

The position, normal, and attribute components of vertex 252 are computed in a manner similar to the computations of the corresponding components of vertex 250. However, in contrast to the operations related to vertex 250, the control points 13, 14, 22, 27, 31 related to edge 18 are not stored in the position and normal areas 1448, 1449 of swappable memory 1418 during computation of the position and normal components of vertex 252. Rather, predetermined combinations of the position and normal control points 22–28, 30–32 are copied from the HOS computation memory 1410 into respective areas 1448, 1449 of the swappable memory 1418 for use in determining new control points 248, 249, 263, 265, 266. For example, the combination $3P_{120}-3P_{030}$ in equation $Q_2$ below related to position control points 252, 248, 249, and 263 is copied from the HOS computation memory 1410 into the position area 1448 of swappable memory 1418 for use in determining control point 248. Similarly, the combination $2N_{101}-2N_{110}$, in equation $Q_2''$ below related to normal control points 252, 265, and 266 is copied from the HOS computation memory 1410 into the normal area 1449 of swappable memory 1418 for use in determining control point 265. The control point combinations are preferably stored in the HOS computation memory 1410 during computation of the position and normal control points 22–28, 30–32.

Alternatively, all the position control points 22–28 and normal control points 30–32 related to the high-order primitive 10 may be copied into respective areas 1448, 1449 of swappable memory 1418 for use in determining the new control points 248, 249, 263, 265, 266 to be used in determining vertex components for vertex 253. For example, control points 22–28 may be copied into the position area 1448 of swappable memory 1418 during the two clock cycles in which the x, y, z, and w-components of vertex 252 are computed by the computation engines 1405, 1406. Similarly, control points 30–32 may be copied into the normal area 1449 of swappable memory 1418 during the two clock cycles in which the x, y, and z-components of normal 274 are computed by the computation engines 1405, 1406. Storage of all the position and normal control points 22–28, 30–32 in their respective areas 1448, 1440 of swappable memory 1418 increases the memory requirements of the swappable memory 1418 and may require repeated computation of various control point combinations. Consequently, storage of all the position and normal control points 22–28, 30–32 in their respective areas 1448, 1440 of swappable memory 1418 is less preferable than storing only the predetermined control point combinations as discussed above.

After all the vertex parameters for vertex 252 have been computed and stored in the TCL input vertex memory 1413, the walking state machine 1419 instructs the position and normal state machines 1420, 1421 to compute respective supplemental control points relating to iso-parametric line 306. The position supplemental control points relating to iso-parametric line 306 preferably consist of vertex 252 and three additional control points 248, 249, and 263 as depicted in FIG. 9. The additional position control points 248, 249, and 263 are preferably determined by performing a dot product of a combination of the original control points 12–14, 22–28 with predetermined coefficients stored in the ISO_C lookup table 1416. Thus, the locations of the supplemental position control points 252, 248, 249, 263 may be determined by evaluating the Bernstein polynomial defining a cubic Bezier triangle for a constant value of the "w" barycentric coordinate and substituting v=1−w−u:

$$B(u) = \sum \frac{6}{i!j!k!} P_{ijk} u^i v^j w^k = Q_1 + Q_2 u + Q_3 u^2 + Q_4 u^3$$

where $Q_1 = P_{030}(1-w)^3 + 3P_{021}w(1-w)^2 + 3P_{012}w^2(1-w) + P_{003}w^3$;

$Q_2 = (3P_{120}-3P_{030})(1-w)^2 + (6P_{111}-6P_{021})w(1-w) + (3P_{102}-3P_{012})w^2$;

$Q_3 = (3P_{210}-6P_{120}+3P_{030})(1-w) + (3P_{021}+3P_{201}-6P_{111})w$; and $Q_4 = P_{300} - 3P_{210} + 3P_{120} - P_{030}$.

In the above equations, $P_{300}$ corresponds to vertex 12, $P_{030}$ corresponds to vertex 14, $P_{003}$ corresponds to vertex 13, $P_{120}$ corresponds to control point 23, $P_{102}$ corresponds td control point 26, $PO_{012}$ corresponds to control point 27, $P_{021}$ corresponds to control point 22, $P_{201}$ corresponds to control point 25, $P_{210}$ corresponds to control point 24, and $P_{111}$ corresponds to control point 28. Each of the above equation results (i.e., $Q_1-Q_4$) define the positions of the supplemental position control points along a particular iso-parametric line and have respective x, y, z, and w-components which are stored in the position area 1448 of swappable memory 1418. For example, when the iso-parametric line is line 306, the value of the "w" barycentric coordinate is 0.5 and the four supplemental control points correspond to control points 252, 248, 249 and 263. For line 306, equation $Q_1$ defines vertex/control point 252, equation $Q_2$ defines control point 248, equation $Q_3$ defines control point 249, and equation $Q_4$ defines control point 263. The coefficients stored in the ISO_C table 1416 may be given by the following formulas for the iso-parametric lines for which the "w" barycentric coordinate is constant:

$$(1-w)^3,\ w(1-w)^2,\ (1-w)w^2,\ (1-w),\ (1-w)w,\ w,\ w^2,\ \text{and}\ w^3.$$

The results of the above formulas (i.e., coefficients) for various values of "w" are stored as entries in the ISO_C lookup table 1416 for a predetermined number of tessellation levels to facilitate the determination of the supplemental control points, which in turn are used in determining the supplemental vertices along iso-parametric lines.

The supplemental position control points 252, 248, 249, 263 are computed as dot products between various combinations and scaled values of the original position control position points 12–14, 22–28 and the coefficients stored in the ISO_C table 1416. For example, supplemental control point 248 is preferably computed by the following dot product to produce the x, y, and z-coordinates of the control point 248:

$$CP_{248}=[(3P_{120}-3P_{030})\ (6P_{111}-6P_{021})(3P_{012}-2P_{012})]\cdot[(1-w)^2\ w(1-w)w^2]$$

The coordinates of the remaining additional control points 249, 263 are computed in a similar manner. The position coordinates of vertex 252 are preferably copied to both TCL input vertex memory 1413 and the position area 1448 of swappable memory 1418 after being computed by the computation engines 1405, 1406.

As the additional control points 248, 249, 263 are computed, they are stored in the position area 1448 of swappable memory 1418 together with control point 252. The supplemental control points 252, 248, 249, 263 are then used to compute position components of the vertices (in the case of iso-parametric line 306, a single vertex 253) within the boundary of the high-order primitive 10 that are located along the particular iso-parametric line 306. To compute vertex 253 (or any other vertex within the boundary of the high-order primitive 10 that is located along an iso-parametric line 306), the Bernstein polynomial defining a cubic Bezier triangle is evaluated at the supplemental control points 252, 248, 249, 263. Thus, in a manner similar to the computation of the vertices 250, 252, 255 along edge 20, the computation engine 1405, 1406 performs a dot product of the supplemental control points 252, 248, 249, 263 with particular weighting factors stored in the ISO lookup table 1417. The weighting factors stored in the ISO lookup table 1417 provide a cubic relation between the supplemental control points (e.g., control points 252, 248, 249 and 263) and the position coordinates of the supplemental vertices (e.g., vertex 253) located along lines in which one barycentric coordinate is constant (i.e., along iso-parametric lines). The weighting factors stored in the ISO table 1417 are the weights applied to the supplemental control points 252, 248, 249, 263 in the expanded Bernstein polynomial, and are stored based on tessellation level. That is, with respect to the equation $B(u)=Q_1u^0+Q_2u^1+Q_3u^2+Q_4u^3$ provided above, the ISO table 1417 stores the values of $u^1$, $u^2$, and $u^3$ for particular tessellation levels. One of ordinary skill in the art will appreciate that the value of $u^0$ is always one and, therefore, need not be stored in the ISO table 1417.

The normal supplemental control points relating to iso-parametric line 306 preferably consist of vertex 252 and two additional control points 265 and 266 as depicted in FIG. 9. The additional normal control points 265 and 266 are preferably determined by performing a dot product of a combination of the original normal control points 12–14, 30–32 with predetermined coefficients stored in the ISO_C lookup table 1416. Thus, the locations of the supplemental normal control points 252, 265, 266 may be determined by evaluating the Bernstein polynomial defining a quadratic Bezier triangle for a constant value of the "w" barycentric coordinate and substituting v=1−w−u:

$$B(u) = \sum \frac{2}{i!j!k!} N_{ijk} u^i v^j w^k = Q_1^n + Q_2^n u + Q_3^n u^2$$

where $Q_1^n = N_{020}(1-w)^2 + 2N_{011}w(1-w) + N_{002}w^2$;

$Q_2^n = (2N_{101}-2N_{110})w + (2N_{011}-2N_{020})(1-w)$; and $Q_3^n = N_{020} - 2N_{011} + N_{002}$.

In the above equations, $N_{020}$ corresponds to vertex 14, $N_{002}$ corresponds to vertex 13, $N_{110}$ corresponds to control point 32, $N_{101}$ corresponds to control point 30, and $N_{011}$ corresponds to control point 31. Each of the above equation results (i.e., $Q_1^n$–$Q_3^n$) define the positions of the supplemental normal control points along a particular iso-parametric line and have respective x, y, and z-components which are stored in the normal area 1449 of swappable memory 1418. For example, when the iso-parametric line is line 306, the value of the "w" barycentric coordinate is 0.5 and the three supplemental normal control points correspond to control points 252, 265 and 266. For line 306, equation $Q_1^n$ defines vertex/control point 252, equation $Q_2^n$ defines control point 265, and equation $Q_3^n$ defines control point 266. The coefficients stored in the ISO_C table 1416 may be given by the following formulas for the iso-parametric lines for which the "w" barycentric coordinate is constant:

$$(1-w)^2,\ (1-w)w,\ (1-w),\ w,\ \text{and}\ w^2.$$

The values of the results of the above formulas for various values of "w" are stored as entries in the ISO_C lookup table 1416 for a predetermined number of tessellation levels.

The supplemental normal control points 252, 265, 266 are computed as dot products between various combinations and scaled values of the original normal control position points 12–14, 30–32 and corresponding coefficients stored in the ISO_C lookup table 1416. For example, supplemental control point 265 is preferably computed by the following dot product to produce the x, y, and z-coordinates of the control point 265:

$$CP_{265}=[(2N_{101}-2N_{110})\ (2N_{011}-2N_{020})]\cdot[w(1-w)]$$

The coordinates of the remaining additional normal control point 266 are computed in a similar manner. The position coordinates of vertex 252 are preferably copied to both TCL input vertex memory 1413 and the normal area 1449 of swappable memory 1418 after being computed by the computation engines 1405, 1406.

As additional normal control points 265 and 266 are computed, they are stored in the normal area 1449 of swappable memory 1418 together with control point 252. The supplemental control points 252, 265, 266 are then used to compute normal components of the vertices (in the case of iso-parametric line 306, a single vertex 253) within the boundary of the high-order primitive 10 that are located along the particular iso-parametric line 306. To compute normal 275 (or any other normal for a vertex within the boundary of the high-order primitive 10 that is located along an iso-parametric line 306), the Bernstein polynomial defining a quadratic Bezier triangle is evaluated at the supplemental control points 252, 265, 266. Thus, in a manner similar to the computation of the normal components of the vertices 250, 252, 255 along edge 20, the computation engine 1405, 1406 performs a dot product of the supplemental normal control points 252, 265, 266 with particular weighting factors stored in the ISO lookup table 1417. The weighting factors stored in the ISO lookup table 1417 provide a quadratic relation between the supplemental control points (e.g., control points 252, 265 and 266) and the normal components (e.g., normal 275) of the supplemental vertices (e.g., vertex 253) located along lines in which one barycentric coordinate is constant (i.e., along iso-parametric lines). The weighting factors stored in the ISO table 1417 are the weights applied to the supplemental control points 252, 265, 266 in the expanded Bernstein polynomial, and are stored based on tessellation level. That is, with respect to the equation $B(u)=Q_1 u^0 + Q_2 u^1 + Q_3 u^2$ provided above, the ISO table 1417 stores the values of $u^1$ and $u^2$ for particular tessellation levels. As noted above, $u^0$ is always one and need not be stored.

Similar to the computation of the position, normal and attribute components of the edge vertices 250–252, the lower level state machines 1420–1422 issue respective series of operation codes, including double and/or single instruction codes, instructing the computation engines 1405, 1406 to compute the position, normal and attribute components of the interior vertices 253 along the particular iso-parametric line 306 currently being evaluated. The order in which the issued operation codes are executed is controlled by the HOS arbiter 1427 and the arbitration module 1403 as described above. The position and normal state machines 1420, 1421 may also issue operation codes instructing the computation engines 1405, 1406 to copy the control points associated with an edge into respective areas 1448, 1449 of swappable memory 1418 if the next vertex to be computed is along the edge. For example, in addition to issuing operation codes for computing the position components of vertex 253, the position state machine 1420 also issues operation codes for copying the control points 13, 14, 22, 27 related to edge 18 to the position area 1448 of swappable memory 1418 because the next vertex to be computed is vertex 254, which lies along both iso-parametric line 306 and edge 18.

If, however, the next vertex to be computed lies along the current iso-parametric and within the boundary of the high-order primitive 10 (e.g., if vertex 256 is being computed along iso-parametric line 304 and the next vertex to be computed is vertex 257 also along iso-parametric line 304), nothing additional need be copied into swappable memory 1418 because the position and normal control points for the next vertex have already been computed and stored in their appropriate locations in swappable memory 1418 in preparation for computing the position and normal components of the vertex being computed presently. For example, if the components of vertex 256 are presently being computed, nothing additional need be stored in swappable memory 1418 to facilitate the computation of the components of vertex 257.

Since, in this example, the next vertex to be computed is vertex 254, the position and normal control points 13, 14, 22, 27, 31 are copied into respective areas 1448, 1449 of swappable memory 1418 during the computation cycle or cycles in which the components of vertex 253 are computed.

After the vertex components of vertex 253 have been computed and stored in TCL input vertex memory 1413, the walking state machine 1419 instructs the TCL input vertex memory 1413 to output primitives 229 and 235, and de-allocate or delete vertex 250 from TCL input vertex memory 1413. Thus, in accordance with the reuse methodology of the present invention, computed vertices remain in TCL input vertex memory 1413 until they are no longer needed to construct a tessellated primitive. Once a vertex is no longer needed to construct a tessellated primitive, the walking state machine 1419 instructs the TCL input vertex memory 1413 to de-allocate or delete the unneeded vertex to make room for additional vertices and, thereby, facilitate use of a TCL input vertex memory 1413 without extraordinary memory requirements.

The remaining vertices 254–259 of the tessellated primitives 221–236 are computed in order along iso-parametric lines starting at one edge 20, traversing the iso-parametric line to the other edge 18 and then returning to the starting edge 20 to repeat the process. As discussed above, control points, if any, that may be necessary to facilitate a subsequent computation are copied into appropriate areas of swappable memory 1418 during the computation cycle or cycles used to compute the components of a current vertex. In addition, computed vertices remain stored in the TCL input vertex memory 1413 until they are no longer needed to construct a yet-to-be-outputted tessellated primitive, at which time they are de-allocated from the TCL input vertex memory 1413. One of ordinary skill will recognize that when the vertex being computed is vertex 12 (in which case the components of vertex 12 are copied into TCL input vertex memory 1413), the control points 12, 14, 23, 24 related to edge 19 are copied into swappable memory 1418, instead of supplemental control points being generated, because all the new vertices 259–261 that lie along iso-parametric line 302 also lie along edge 19.

Although the general operation of the high-order primitive processing unit 460 to perform the functions of the control point generation block 420 and the tessellation block 430 has been described above, such operation may be varied in accordance with the present invention to significantly reduce the quantity of computations for low-level tessellation. As discussed above, for a tessellation level of one, only one additional vertex 131–133 is computed along each edge 18–20 as illustrated in FIG. 11. In addition, as discussed above, the position, normal and attribute components of the additional vertices 131–133 can be computed directly from the components of original vertices 12–14 of the high-order primitive 10 without resort to the generation and use of control points. For example, the position and normal components of vertices 131–133 may be computed directly from the position and normal components of the original vertices 12–14 from the following equations:

for position:

$V_{131} = \frac{1}{2}(V_{13}+V_{12}) + \frac{1}{8}[(E_{20} \cdot N_{13})N_{13} - (E_{20} \cdot N_{12})N_{12}]$, $V_{132} = \frac{1}{2}(V_{14}+V_{13}) + \frac{1}{8}[(E_{18} \cdot N_{14})N_{14} - (E_{18} \cdot N_{13})N_{13}]$, and $V_{133} = \frac{1}{2}(V_{12}+V_{14}) + \frac{1}{8}[(E_{19} \cdot N_{12})N_{12} - (E_{19} \cdot N_{14})N_{14}]$, for normal:

$N_{131} = \frac{1}{2}(N_{13}+N_{14}) - \frac{1}{8}[E_{18} \cdot N_{13} + E_{18} \cdot N_{14}][E_{18}/|E_{18}|^2]$, $N_{132} = \frac{1}{2}(N_{12}+N_{13}) - \frac{1}{8}[E_{20} \cdot N_{12} + E_{20} \cdot N_{13}][E_{20}/|E_{20}|^2]$, and $N_{133} = \frac{1}{2}(N_{12}+N_{14}) - \frac{1}{8}[E_{19} \cdot 12 + E_{19} \cdot N_{14}][E_{19}/|E_{19}|^2]$, where $E_{18}=V_{13}-V_{14}$, $E_{19}=V_{12}-V_{14}$, and $E_{20}=V_{13}-V_{12}$.

Thus, the position and normal components of vertices 131–133 may be computed by the computation engines

1405, 1406 responsive to operation codes issued respectively by the position and normal state machines 1420, 1421 instructing the computation engines 1405, 1406 to perform the respective scalar and vector operations required by the above equations. For example, to compute the positions of vertices 131–133, the position state machine 1420 issues a respective series of operation codes to compute the equations for $V_{131}$–$V_{133}$. Each series of operation codes effectively instruct the computation engines 1405, 1406 to compute one-eighth of the scaled difference between projections of an edge defined by any two consecutive vertices onto the normal vectors of the two consecutive vertices in a clockwise direction summed with an average of the position coordinates of the two consecutive vertices to determine the position coordinates of the supplemental vertex located along the edge.

All the intermediate computations required by the above equations are preferably stored in the HOS computation memory 1410 as described above. The final position or normal result is then copied by the selected computation engine 1405, 1406 into the register of the TCL input vertex memory 1413 associated with the vertex 131–133 being computed responsive to a "COPY" instruction code issued by the appropriate state machine 1420, 1421. By performing direct computation of new vertex components for low level tessellation (e.g., for tessellation levels of one or two), the present invention substantially reduces the amount of processing time and resources necessary to compute the vertex components as compared to first computing control points and then computing vertex components.

By performing high-order primitive tessellation in hardware as described above, the present invention facilitates more rapid processing of high-order graphics primitives as compared to the prior art. In contrast to the prior art, which employs the application host processor to perform tessellation in software, the present invention preferably uses a unique hardware implementation premised on the generation of control points to expedite computation of vertex parameters for the tessellated primitives, and vertex parameter reusability resulting from generation of vertices along iso-parametric lines to reduce memory requirements and reduce the amount of redundant transform, clipping, and lighting (TCL) processing performed on the newly generated vertices. By performing tessellation in hardware, the application running on the central processor can issue drawing commands for large non-planar primitives that identify respective desired tessellation levels and can rely on the hardware to efficiently perform the necessary tessellation, thereby reducing the bandwidth requirements for communicating primitive vertex information from the application to the graphics processing hardware when tessellation is required.

In addition, the present invention preferably utilizes various degrees of interpolation to derive the vertex parameters for the vertices of the tessellated primitives, in sharp contrast to prior art tessellation techniques that only use linear interpolation to compute all the vertex parameters. For example, the present invention preferably utilizes cubic interpolation to generate the position components of the vertices, quadratic interpolation to generate the normals of the vertices (which, as is known, are used to perform lighting processing on the vertices), and linear interpolation for the remaining vertex attributes. Such use of various degrees of interpolation to determine vertex components of tessellated primitives improves the quality of displayed images that include high-order primitives, while balancing the computational costs for obtaining such improved image quality.

Figure 15:
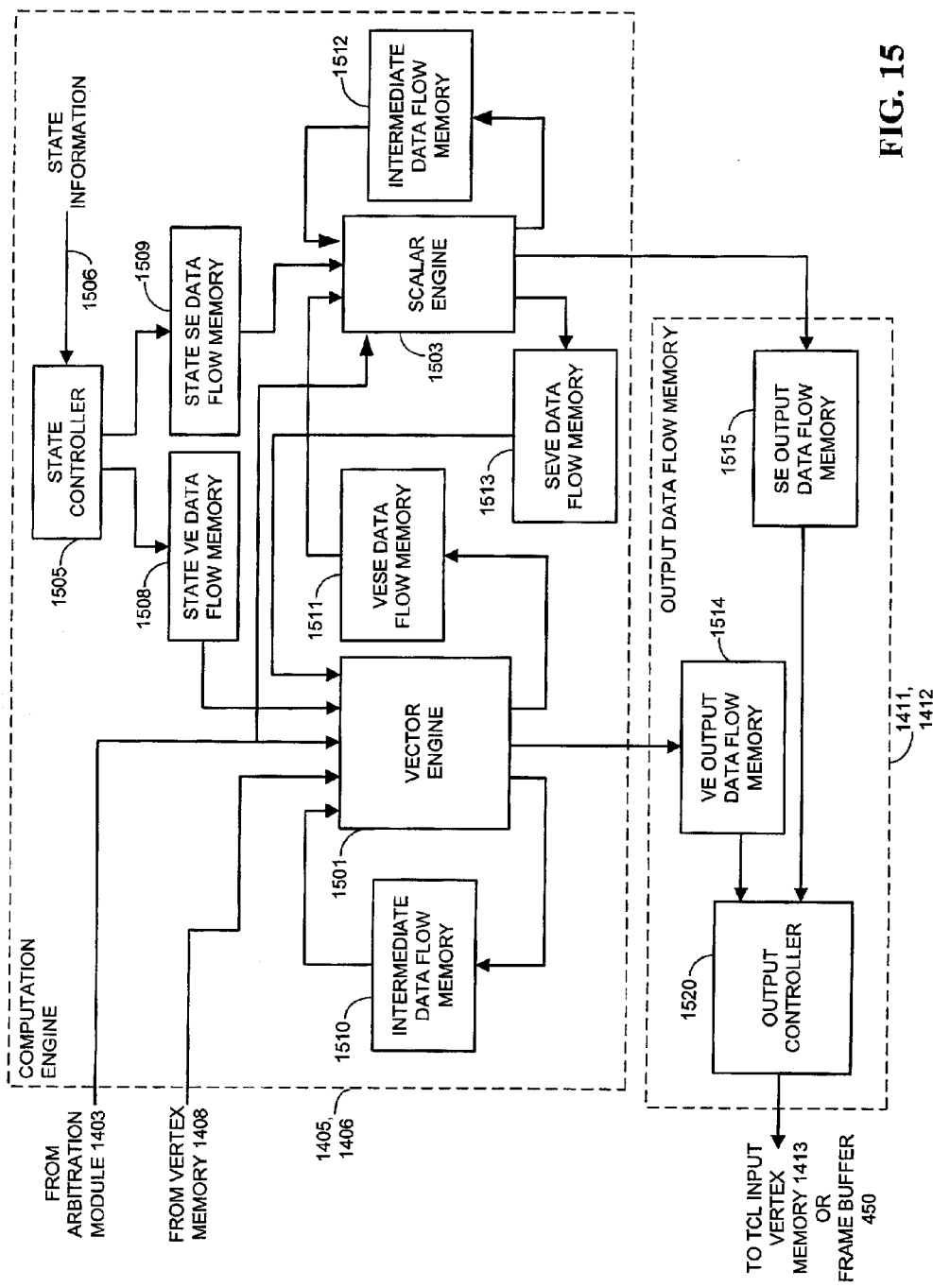
FIG. 15 illustrates a block diagram of a preferred computation engine and output data flow memory for use in the high-order primitive processing unit of FIG. 14.

FIG. 15 illustrates a block diagram of a preferred computation engine 1405, 1406 and output data flow memory 1411, 1412 for use in the high-order primitive processing unit 460 of FIG. 14. The computation engine 1405, 1406 includes a vector engine 1501, a scalar engine 1503, a state controller 1505, the arbitration module 14, and a plurality of data flow memory devices 1508–1515. In general, the vector engine 1501 processes vector information for the attributes of a given vertex of a primitive. The vector engine 1501 is designed to perform particular types of mathematical operations in an efficient manner. Such mathematical operations include vector dot products operations, vector addition operations, vector subtraction operations, vector multiply and accumulate operations, and vector multiplication operations. The vector dot products ($V_0 \cdot V_1$) generally performed by the vector engine 1501 correspond to $(x_0 \cdot x_1)+(y_0 \cdot y_1)+(z_0 \cdot z_1)+(w_0 \cdot w_1)$, where $x_0$, $y_0$, $z_0$, and $w_0$ may be the x-coordinates for vector $V_0$ (e.g., the vector control point x-coordinates) and $x_1$, $y_1$, $z_1$, and $w_1$, may be coordinates for vector $V_1$ (e.g., the vector of weighting factors in the edge table 1415).

The scalar engine 1503 may be generally dedicated to performing lighting effect functions. The scalar engine 1503 is capable of performing a variety of scalar operations such as inverse functions, $x^y$ functions, $e^x$ functions, $1/x$ functions, and the inverse of the square root of x functions. The $1/x$ function may be used for determining a range for lighting effects, the $x^y$ function may be used for specular lighting effects, the $e^x$ function may be used for fogging effects, and the inverse of the square root of x may be used in normalized vector calculations. In addition, the scalar engine 1503 may support state functions as defined in the OpenGL specification.

The vector engine 1501 produces results based on the ordered operation codes received from the arbitration module 1403. The results produced may be stored in the intermediate data flow memory 1510 (e.g., the HOS computation memory 1410), a vector engine (VE) output flow data memory 1514 of the overall output data flow memory 1411, 1412 or a vector engine-scalar engine (VESE) data flow memory 1511. The VESE data flow memory 1511 represents an inter-engine data path that allows the results of the vector engine 1501 to be provided to the scalar engine 1503. The communication of results to the intermediate data flow memory 1510 and the output data flow memory 1411, 1412 were discussed above with reference to FIG. 14. If the result is stored in the VESE data flow memory 1511, the data may be used in subsequent processing by the scalar engine 1503, such as that involving the calculation of lighting effects.

The state controller 1505 receives state information 1506 from the application originating the drawing commands and either stores it in the state vector engine (VE) data flow memory 1508 or the state scalar engine (SE) data flow memory 1509. The state information 1506 indicates the particular mode of operation within which the vector and scalar engines 1501 and 1503 are executing. The state information 1506 may be state information that defines specific operational modes compliant with those described in the OpenGL specification.

The scalar engine 1503 produces results that are stored in at least one of a scalar engine-vector engine (SEVE) data flow memory 1513, a scalar engine intermediate data flow memory 1512 (e.g., the HOS computation memory 1410), and a scalar engine (SE) output data flow memory 1515. The scalar engine intermediate data flow memory 1512 stores results produced by the scalar engine 1503 that are used in subsequent operations by the scalar engine 1503. The SEVE data flow memory 1513 represents an inter-engine data path that allows the results of the scalar engine 1513 to be provided to the vector engine 1501. The data carried along inter-engine data paths (whether vector engine-to-scalar engine or scalar engine-to-vector engine) may be referred to as inter-engine data.

The particular destination for a result of the scalar engine 1503 is based on the operation code being executed. The arbitration module 1403 preferably generates ordered operation codes for the scalar engine 1503. Each operation code provided to the scalar engine 1503 preferably includes a corresponding destination address for the result that is generated through execution of the code. By having dedicated memories in each data flow path (as shown in FIG. 15), memory contention is eliminated. During each cycle, each memory 1508–1515 is only expected to provide one operand to one operation unit in the system. In one embodiment, each memory 1508–1515 includes a read port and a write port, where a read operation and a write operation can occur for the memory during a cycle. In another embodiment, some memory (e.g., HOS computation memory 1410) may include two read ports and one write port, where two read operations and a write operation can occur for the memory during a cycle. An output controller 1520 is also included in the output data flow memory 1411, 1412 to control the flow of data from the VE and SE output data flow memories 1514, 1515 to the TCL input vertex memory 1413 (when additional processing is still necessary) or the frame buffer 450 (when all vertex processing is complete). When the computation engine 1405, 1406 is used as a geometric engine for graphics processing, the computation engine 1405, 1406 is performing specific, well-understood functions such that the various state variables, intermediate data storage locations, and the like may be known in advance. By performing such specific functions, memory locations available in the various memories 1508–1515 may be dedicated to particular portions of one or more operations, thus eliminating memory contention issues.

One of ordinary skill in the art will recognize that a number of optimizations, such as pre-accumulation registering, per-thread accumulation buffering, shared microcode amongst a plurality of threads, and memory bypass registers, can be included in the vector engine 1501 and scalar engine 1503 illustrated in FIG. 15 to allow the functionality of the computation engine 1405, 1406 to be further exploited to gain added efficiency. Each of these optimizations may be used alone or in combination with one another to increase processing efficiency.

The present invention provides a means for determining Bezier control meshes that can be used to allow for tessellation of high-order video graphics primitives in hardware. The present invention allows the central processor in a computing system to offload the tessellation to dedicated hardware such that processing resources within the central processor are available for performing other tasks. As a result, the overall computing system may operate more efficiently. Use of the barycentric coordinate system in evaluating the Bernstein polynomials or other algorithms simplifies the calculations required to obtain the component data for the vertices of the tessellated primitives resulting from tessellation. Simplification of these calculations enables such tessellation to be performed using a limited amount of hardware, thus making a hardware implementation of tessellation circuitry feasible as describe herein.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

What is claimed is:

1. A method for generating a cubic Bezier triangular control mesh corresponding to a triangular primitive, comprising:

receiving vertex parameters corresponding to three vertices of the triangular primitive, wherein the vertex parameters for each vertex include three-dimensional coordinates and a normal vector;

calculating two control points corresponding to each edge of three edges of the triangular primitive based on the vertex parameters of vertices that define the edge; and calculating a central control point using the vertex parameters for each of the three vertices and the control points corresponding to the three edges.

2. The method of claim 1, wherein calculating two control points corresponding to an edge further comprises:

mapping a segment equal to a fraction of a length of the edge to a first plane defined by a first normal corresponding to a first vertex of the vertices that define the edge, wherein the segment is mapped such that the segment is coplanar with the edge and the first normal, wherein a first end of the segment as mapped corresponds to the first vertex and wherein a second end of the segment as mapped defines a first control point corresponding to the edge; and mapping the segment to a second plane defined by a second normal corresponding to a second vertex of the vertices that define the edge, wherein the segment is mapped such that the segment is coplanar with the edge and the second normal, wherein a first end of the segment as mapped corresponds to the second vertex and wherein a second end of the segment as mapped defines a second control point corresponding to the edge.

3. The method of claim 2, wherein the fraction of the length is within a range of one-quarter to one-half of the length.

4. The method of claim 3, wherein the fraction of the length is approximately one-third of the length.

5. The method of claim 2, wherein the fraction of the length is specified by a user.

6. The method of claim 1, wherein calculating two control points corresponding to an edge further comprises:

projecting a second vertex of the vertices that define the edge into a first plane defined by a first normal corresponding to a first vertex of the vertices that define the edge to produce a first reference segment corresponding to the edge, wherein projecting the second vertex is performed in a direction parallel to the first normal, wherein a fraction of the first reference segment defines a first control point corresponding to the edge; and projecting the first vertex into a second plane defined by a second normal corresponding to the second vertex to produce a second reference segment corresponding to the edge, wherein projecting the first vertex is performed in a direction parallel to the second normal, wherein a fraction of the second reference segment defines a second control point corresponding to the edge.

7. The method of claim 6, wherein the fraction of the first reference segment is approximately one-third of the first reference segment, and wherein the fraction of the second reference segment is approximately one-third of the second reference segment.

8. The method of claim 1, wherein calculating the central control point further comprises:

reflecting each of the three vertices through a line defined by a pair of the control points to produce a reflected point, wherein each control point of the pair of control points for reflection of a particular vertex is determined using a plane defined by the normal corresponding to the particular vertex, wherein the reflected point is defined by a set of three-dimensional coordinates;

averaging the three-dimensional coordinates of the reflected points produced by reflecting the three vertices to produce coordinates corresponding to the central control point.

9. The method of claim 1, wherein calculating the central control point further comprises determining each coordinate value for the central control point by:

adding corresponding coordinate values of the control points for each of the edges to produce a first sum;

adding corresponding coordinate values for the three vertices to produce a second sum;

dividing the first sum by four to produce a first value;

dividing the second sum by six to produce a second value; and subtracting the second value from the first value to determine the coordinate value.

10. The method of claim 1, wherein calculating the central control point further comprises combining at least a portion of the vertex parameters of the three vertices and parameters for the control points corresponding to the edges based on user-specified combining parameters.

11. A method for generating planar video graphics primitives for representing a non-planar surface, comprising:

receiving vertex parameters corresponding to three vertices of a triangular primitive that represents the non-planar surface, wherein the vertex parameters for each vertex include three-dimensional coordinates and a normal vector;

calculating a set of control points corresponding to the triangle primitive based on the three vertices, wherein the set of control points and the vertices define a cubic Bezier triangular control mesh; and generating a plurality of planar triangle primitives using the cubic Bezier triangular control mesh, wherein the plurality of planar triangle primitives approximate the non-planar surface in three dimensions.

12. The method of claim 11 further comprises processing the plurality of planar triangle primitives using a three dimensional pipeline to produce pixel data corresponding to an image that represents the non-planar surface.

13. The method of claim 11, wherein calculating the set of control points includes:

calculating two control points corresponding to each edge of three edges of the triangular primitive based on the vertex parameters of vertices that define the edge; and calculating a central control point using the vertex parameters for each of the three vertices and the control points corresponding to the three edges.

14. The method of claim 13 wherein calculating two control points corresponding to an edge further comprises:

mapping a segment equal to a fraction of a length of the edge to a first plane defined by a first normal corresponding to a first vertex of the vertices that define the edge, wherein the segment is mapped such that the segment is coplanar with the edge and the first normal, wherein a first end of the segment as mapped corresponds to the first vertex and wherein a second end of the segment as mapped defines a first control point corresponding to the edge; and mapping the segment to a second plane defined by a second normal corresponding to a second vertex of the vertices that define the edge, wherein the segment is mapped such that the segment is coplanar with the edge and the second normal, wherein a first end of the segment as mapped corresponds to the second vertex and wherein a second end of the segment as mapped defines a second control point corresponding to the edge.

15. The method of claim 14, wherein the fraction of the length is within a range of one-quarter to one-half of the length.

16. The method of claim 15, wherein the fraction of the length is approximately one-third of the length.

17. The method of claim 13, wherein calculating two control points corresponding to an edge further comprises:

projecting a second vertex of the vertices that define the edge into a first plane defined by a first normal corresponding to a first vertex of the vertices that define the edge to produce a first reference segment corresponding to the edge, wherein projecting the second vertex is performed in a direction parallel to the first normal, wherein a fraction of the first reference segment defines a first control point corresponding to the edge; and projecting the first vertex into a second plane defined by a second normal corresponding to the second vertex to produce a second reference segment corresponding to the edge, wherein projecting the first vertex is performed in a direction parallel to the second normal, wherein a fraction of the second reference segment defines a second control point corresponding to the edge.

18. The method of claim 17, wherein the fraction of the first reference segment is approximately one-third of the first reference segment, and wherein the fraction of the second reference segment is approximately one-third of the second reference segment.

19. The method of claim 13, wherein calculating the central control point further comprises:

reflecting each of the three vertices through a line defined by a pair of the control points to produce a reflected point, wherein each control point of the pair of control points for reflection of a particular vertex is determined using a plane defined by the normal corresponding to the particular vertex, wherein the reflected point is defined by a set of three-dimensional coordinates;

averaging the three-dimensional coordinates of the reflected points produced by reflecting the three vertices to produce coordinates corresponding to the central control point.

20. The method of claim 13, wherein calculating the central control point further comprises determining each coordinate value for the central control point by:

adding corresponding coordinate values of the control points for each of the edges to produce a first sum;

adding corresponding coordinate values for the three vertices to produce a second sum;

dividing the first sum by four to produce a first value;

dividing the second sum by six to produce a second value; and subtracting the second value from the first value to determine the coordinate value.

21. The method of claim 13, wherein calculating the central control point further comprises combining at least a portion of the vertex parameters of the three vertices and parameters for the control points corresponding to the three edges based on user-specified combining parameters.

22. The method of claim 11, wherein generating the plurality of planar triangle primitives is based on a tessellation level, wherein the tessellation level determines a number of planar triangle primitives included in the plurality of planar triangle primitives.

23. The method of claim 11, wherein generating the plurality of planar triangle primitives further comprises determining vertex values for vertices of each planar triangle primitive of the plurality of planar triangle primitives, wherein at least a portion of the vertex values are determined by evaluating a Bernstein polynomial using the set of control points and the vertices that define the cubic Bezier triangular control mesh.

24. The method of claim 23, wherein evaluating the Bernstein polynomial further comprises evaluating the cubic Bezier triangular control mesh at the vertices of each planar triangle primitive of the plurality of planar triangle primitives.

25. The method of claim 24, wherein evaluating the Bernstein polynomial is based on calculations using Barycentric coordinates, with respect to the triangular primitive, of the vertices of each planar triangle primitive of the plurality of planar triangle primitives.

26. The method of claim 23, wherein the vertex values for each vertex of each planar triangle primitive of the plurality of planar triangle primitives further includes a planar primitive vertex normal corresponding to each vertex of the planar triangle primitive, wherein each planar primitive vertex normal is generated by interpolation using vertex normals of the triangular primitive.

27. The method of claim 26, wherein each planar primitive vertex normal is re-normalized after generation using interpolation.

28. The method of claim 26, wherein the interpolation used in generation of each planar primitive vertex normal uses Barycentric coordinates.

29. The method of claim 26, wherein the interpolation is linear interpolation.

30. The method of claim 26, wherein the interpolation is quadratic interpolation.

31. The method of claim 23, wherein the vertex values for each vertex of each planar triangle primitive of the plurality of planar triangle primitives include at least one of texture coordinates, color data, and fog data.

32. The method of claim 23, wherein at least a portion of the vertex values for each vertex of each planar triangle primitive of the plurality of planar triangle primitives is calculated using linear interpolation.

33. A video graphics processing system, comprising:

a processor that generates a higher-order graphics primitive;

a control point generation block operably coupled to the processor, wherein the control point generation block generates a control mesh for the higher-order graphics primitive; a tessellation block operably coupled to the control point generation block, wherein the tessellation block tessellates the higher-order graphics primitive to produce a plurality of planar triangle primitives; and a three-dimensional graphics pipeline operably coupled to the tessellation block, wherein the three-dimensional graphics pipeline processes the plurality of planar triangle primitives to produce pixel data.

34. The video graphics processing system of claim 33, wherein the higher-order graphics primitive is a higher-order triangular primitive that is defined by vertex parameters for three vertices, wherein the vertex parameters for each vertex include a normal vector and three-dimensional coordinates.

35. The video graphics processing system of claim 34, wherein the control point generation block generates the control mesh by:

calculating two control points corresponding to each edge of three edges of the triangular primitive based on the vertex parameters of vertices that define the edge; and calculating a central control point using the vertex parameters for each of the three vertices and the control points corresponding to the three edges.

36. The video graphics processing system of claim 35, wherein the control point generation block calculates the two control points corresponding to an edge by:

mapping a segment equal to a fraction of a length of the edge to a first plane defined by a first normal corresponding to a first vertex of the vertices that define the edge, wherein the segment is mapped such that the segment is coplanar with the edge and the first normal, wherein a first end of the segment as mapped corresponds to the first vertex and wherein a second end of the segment as mapped defines a first control point corresponding to the edge; and mapping the segment to a second plane defined by a second normal corresponding to a second vertex of the vertices that define the edge, wherein the segment is mapped such that the segment is coplanar with the edge and the second normal, wherein a first end of the segment as mapped corresponds to the second vertex and wherein a second end of the segment as mapped defines a second control point corresponding to the edge.

37. The video graphics processing system of claim 36, wherein the fraction of the length is within a range of one-quarter to one-half of the length.

38. The video graphics processing system of claim 37, wherein the fraction of the length is approximately one-third of the length.

39. The video graphics processing system of claim 36, wherein the fraction of the length is specified by a user.

40. The video graphics processing system of claim 35, wherein the control point generation block calculates the two control points corresponding to an edge by:

projecting a second vertex of the vertices that define the edge into a first plane defined by a first normal corresponding to a first vertex of the vertices that define the edge to produce a first reference segment corresponding to the edge, wherein projecting the second vertex is performed in a direction parallel to the first normal, wherein a fraction of the first reference segment defines a first control point corresponding to the edge; and projecting the first vertex into a second plane defined by a second normal corresponding to the second vertex to produce a second reference segment corresponding to the edge, wherein projecting the first vertex is performed in a direction parallel to the second normal, wherein a fraction of the second reference segment defines a second control point corresponding to the edge.

41. The video graphics processing system of claim 40, wherein the fraction of the first reference segment is approximately one-third of the first reference segment, and wherein the fraction of the second reference segment is approximately one-third of the second reference segment.

42. The video graphics processing system of claim 35, wherein the control point generation block calculates the central control point by:

reflecting each of the three vertices through a line defined by a pair of the control points to produce a reflected point, wherein each control point of the pair of control points for reflection of a particular vertex is determined using a plane defined by the normal corresponding to the particular vertex, wherein the reflected point is defined by a set of three-dimensional coordinates;

averaging the three-dimensional coordinates of the reflected points produced by reflecting the three vertices to produce coordinates corresponding to the central control point.

43. The video graphics processing system of claim 33 further comprises at least one vector engine operably coupled to the control point generation block, wherein the at least one vector engine is used for performing calculations associated with generating the control mesh.

44. The video graphics processing system of claim 33 further comprises memory operably coupled to the control point generation block and the tessellation block, wherein the memory stores the control mesh for use by the tessellation block.

45. The video graphics processing system of claim 33, wherein the tessellation block produces the plurality of planar triangle primitives using at least one of linear interpolation and calculations using Barycentric coordinates.

46. The video graphics processing system of claim 33, wherein the control point generation block calculates the central control point by combining at least a portion of the vertex parameters of the three vertices and parameters for the control points corresponding to the edges based on user-specified combining-parameters.

47. The video graphics processing system of claim 33, wherein the control point generation block calculates the central control point such that it includes determining each coordinate value for the central control point by:

adding corresponding coordinate values of the control points for each of the edges to produce a first sum;

adding corresponding coordinate values for the three vertices to produce a second sum;

dividing the first sum by four to produce a first value;

dividing the second sum by six to produce a second value; and subtracting the second value from the first value to produce the coordinate value.

48. A method for generating a cubic Bezier triangular control mesh corresponding to a triangular primitive, comprising:

receiving vertex parameters corresponding to three vertices of the triangular primitive, wherein the vertex parameters for each vertex includes three-dimensional coordinates and a normal vector;

calculating two scalar control points corresponding to each edge of three edges of the triangular primitive based on the vertex parameters of vertices that define the edge; and calculating a central control using the vertex parameters for each of the three vertices and the scalar control points using the vertex parameters for each of the three vertices and the control points corresponding to the three edges.

49. The method of claim 48 including calculating the central control point using a dot product of the vertex parameters for each of the three vertices and the scalar control points corresponding to the three edges.

* * * * *